US012073703B2

(12) United States Patent
Konakalla et al.

(10) Patent No.: US 12,073,703 B2
(45) Date of Patent: Aug. 27, 2024

(54) IMAGE BASED AQUATIC ALERT SYSTEM

(71) Applicant: Angarak, Inc., San Diego, CA (US)

(72) Inventors: Sai Akhil Reddy Konakalla, San Diego, CA (US); Satya Abhiram Theli, San Diego, CA (US)

(73) Assignee: Angarak, Inc., San Diego, CA (US)

( * ) Notice: Subject to any disclaimer, the term of this patent is extended or adjusted under 35 U.S.C. 154(b) by 0 days.

(21) Appl. No.: 17/427,043

(22) PCT Filed: Jan. 15, 2021

(86) PCT No.: PCT/US2021/013724
§ 371 (c)(1),
(2) Date: Jul. 29, 2021

(87) PCT Pub. No.: WO2021/146617
PCT Pub. Date: Jul. 22, 2021

(65) Prior Publication Data
US 2022/0343650 A1    Oct. 27, 2022

Related U.S. Application Data

(60) Provisional application No. 63/082,375, filed on Sep. 23, 2020, provisional application No. 62/962,123, filed on Jan. 16, 2020.

(51) Int. Cl.
| G06T 7/194 | (2017.01) |
| G06T 1/20 | (2006.01) |
| G06T 7/20 | (2017.01) |
| G06V 20/40 | (2022.01) |
| G06V 20/52 | (2022.01) |
| G08B 21/08 | (2006.01) |
| H04N 7/18 | (2006.01) |

(52) U.S. Cl.
CPC ............... *G08B 21/08* (2013.01); *G06T 1/20* (2013.01); *G06T 7/194* (2017.01); *G06T 7/20* (2013.01); *G06V 20/41* (2022.01); *G06V 20/44* (2022.01); *G06V 20/52* (2022.01); *H04N 7/188* (2013.01); *G06T 2207/10016* (2013.01); *G06T 2207/20076* (2013.01); *G06T 2207/20081* (2013.01); *G06T 2207/30242* (2013.01)

(58) Field of Classification Search
CPC ........ G08B 21/08; G08B 29/186; G06T 1/20; G06T 2207/10016; G06T 2207/20076; G06T 2207/20081; G06T 2207/30242; G06V 20/41; G06V 20/44; G06V 20/52; H04N 7/188; G06F 18/23213
See application file for complete search history.

(56) References Cited

U.S. PATENT DOCUMENTS

| 6,133,838 A | 10/2000 | Meniere |
| 7,302,081 B2 | 11/2007 | Meniere et al. |
| 7,724,133 B2 | 5/2010 | Laitta et al. |

(Continued)

FOREIGN PATENT DOCUMENTS

| EP | 0 861 481 | 9/1998 |
| EP | 1 340 103 | 9/2003 |

(Continued)

*Primary Examiner* — Timothy R Newlin
(74) *Attorney, Agent, or Firm* — Morrison & Foerster LLP

(57) ABSTRACT

Disclosed herein are systems and methods for detecting an event associated with a swimmer and generating a detection signal associated with the event.

23 Claims, 7 Drawing Sheets

(56) References Cited

U.S. PATENT DOCUMENTS

| | | | |
|---|---|---|---|
| 10,163,323 B1 | 12/2018 | Wu | |
| 11,322,010 B1* | 5/2022 | Madden | G08B 21/086 |
| 2006/0103540 A1 | 5/2006 | Rutter et al. | |
| 2007/0273765 A1* | 11/2007 | Wang | G06T 7/254 |
| | | | 348/152 |
| 2008/0156989 A1 | 7/2008 | Du et al. | |
| 2008/0218332 A1 | 9/2008 | Lyons | |
| 2013/0106610 A1 | 5/2013 | Pratt | |
| 2016/0037138 A1 | 2/2016 | Udler | |
| 2016/0104359 A1* | 4/2016 | AlMahmoud | G01S 7/539 |
| | | | 367/112 |
| 2018/0089980 A1* | 3/2018 | Snyder | G08B 3/10 |
| 2018/0096580 A1* | 4/2018 | Liu | G06T 7/246 |
| 2018/0342139 A1 | 11/2018 | Otavio | |
| 2019/0019008 A1 | 1/2019 | Guan et al. | |
| 2019/0034712 A1 | 1/2019 | Golan et al. | |
| 2019/0073889 A1* | 3/2019 | Potucek | G08B 21/08 |
| 2019/0287378 A1* | 9/2019 | Rogers | G01S 15/86 |
| 2020/0053320 A1* | 2/2020 | Mor | H04N 7/181 |
| 2020/0118412 A1* | 4/2020 | Anderson | H04W 4/023 |
| 2020/0394804 A1* | 12/2020 | Barton | G06V 10/82 |
| 2021/0150191 A1* | 5/2021 | Bar-Ilan | G06V 40/10 |
| 2021/0174073 A1* | 6/2021 | Bar-Ilan | G06V 40/23 |
| 2021/0303830 A1* | 9/2021 | Sun | G06T 7/75 |
| 2022/0044544 A1 | 2/2022 | Rogers et al. | |

FOREIGN PATENT DOCUMENTS

| | | |
|---|---|---|
| WO | WO-93/12592 | 6/1993 |
| WO | WO-97/18542 | 5/1997 |
| WO | WO-02/097758 | 12/2002 |
| WO | WO-2019/202587 | 10/2019 |

* cited by examiner

IMAGE BASED AQUATIC ALERT SYSTEM

CROSS REFERENCE TO RELATED APPLICATIONS

This application is a national stage application under 35 U.S.C. § 371 of International Application No. PCT/US2021/013724 having an international filing date of Jan. 15, 2021, which claims the benefit of U.S. Provisional Application No. 62/962,123, filed on Jan. 16, 2020, and U.S. Provisional Application No. 63/082,375, filed on Sep. 23, 2020, the contents of which are incorporated herein by reference in its entirety for all purposes.

FIELD

This disclosure generally relates to an aquatic alert system. More specifically, this disclosure relates to image based systems and methods for event detection in an aquatic setting.

BACKGROUND

Reducing, avoiding, or preventing death and/or serious injury from drowning in a swimming pool may be difficult by manually monitoring a swimming pool (e.g., with a lifeguard, with a safety personnel, with a guardian). For example, it may be difficult and/or costly for lifeguards to continuously and accurately monitor a swimming pool to reduce the risk of drowning or identify risky behavioral swimming (e.g., doggy paddling, underwater swimming). Solutions exist that may help reduce this risk by assisting the human lifeguard, but they are costly (e.g., high hardware cost, high cost of installation, long installation time), not sufficiently accurate (e.g., high false alarm rates), or both. To reduce hardware cost and increase installation flexibility, a wireless camera may be used for monitoring a swimming pool. However, the camera's source of power (e.g., a battery, a rechargeable battery, solar power) may be limited and power consumption can be high; a limited power source while monitoring may cause interrupted service.

BRIEF SUMMARY

Disclosed herein are systems and methods for detecting an event associated with a swimmer and generating a detection signal associated with the event.

In some embodiments, a system, comprises: a video camera configured to capture frames of a swimming pool; a computing system configured to communicate with the camera and including a processor and memory; and a program stored in the memory, configured to be executed by the processor, and including instructions for: receiving the frames captured with the video camera; for each frame captured with the video camera, identifying: interior pool pixels associated with an interior region of the swimming pool in the frame, the interior pool region including a water area of the swimming pool, background pixels in the frame, foreground pixels in the frame, wherein the foreground pixels correspond to detected foreground objects, and swimming pool information associated with objects in the frame; based on the identified background pixels, foreground pixels, and swimming pool information: forming a block for each swimmer in the foreground pixels, and tagging each swimmer in the frame with a respective identifier; tracking each swimmer by using image tracking and motion prediction algorithms on the formed blocks; determining, based on the swimming pool information and the image tracking and motion prediction algorithms whether a criterion is met for a tracked swimmer; and in accordance with a determination that the criterion is met for the tracked swimmer, generating a detection signal indicating an event associated with the tracked swimmer.

In some embodiments, the instructions further comprise: determining a number of swimmers based on the interior pool and foreground pixels and the swimming pool information; detecting a swimmer leaving or entering the interior pool region; updating the number of swimmers based on the swimmer detection; determining that the swimmer entered the interior pool region after a predetermined amount of time; and in accordance with the determination that the swimmer entered the interior pool region after the predetermined amount of time, tagging the swimmer with an identifier; and in response to detecting the swimmer leaving the interior pool region, untagging the swimmer.

In some embodiments, the instructions further comprise determining a number of swimmers based on the interior pool and foreground pixels and the swimming pool information, and the criterion is met when a number of detected foreground objects is less than the number of swimmers.

In some embodiments, the instructions further comprise determining a number of swimmers based on the interior pool and foreground pixels and the swimming pool information, and the number of swimmers is a number of detected foreground objects.

In some embodiments, the criterion includes at least one of swimmer speed, swimmer posture, a splash threshold, an activity threshold, a submergence threshold, a submergence variance, and swimmer vertical movement.

In some embodiments, the criterion dynamically updates based on a depth corresponding to the swimmer's position in the swimming pool.

In some embodiments, the criterion dynamically updates based a distance of the swimmer from the camera.

In some embodiments, the criterion dynamically updates based on a surrounding brightness of a camera view.

In some embodiments, determining whether the criterion is met further comprises determining a probability of the event based on a criterion emphasis factor associated with the tracked swimmer, and the instructions further comprise: learning behaviors of the tracked swimmers; and updating the criterion emphasis factors of the tracked swimmers based on the learned behaviors.

In some embodiments, the instructions further comprise generating an alert associated with the event in response to the generated detection signal.

In some embodiments, the system further comprises a wearable device, wherein the instructions further comprise transmitting the generated alert to the wearable device.

In some embodiments, the computing system comprises a user interface, and the instructions further comprise: selecting, on the user interface, an activity in the swimming pool; and updating the criterion based on the selected activity.

In some embodiments, the computing system comprises a user interface, and determining whether the criterion is met further comprises determining a probability of the event based on a criterion emphasis factor associated with the tracked swimmer, and the instructions further comprise: selecting, on the user interface, a behavior of a tracked swimmer; and adjusting the criterion emphasis factors of the tracked swimmer based on the selected behavior.

In some embodiments, the instructions further comprise: tracking a history of the swimming pool; learning site attributes of the swimming pool based on the history; and updating the criterion based on the learned site attributes.

In some embodiments, determining whether the criterion is met further comprises determining a probability of the event based on a criterion emphasis factor associated with the tracked swimmer, and the instructions further comprise: determining whether the swimming pool is a first type of swimming pool or a second type of swimming pool; in accordance with a determination that the swimming pool is the first type, setting the criterion emphasis factors of the tracked swimmers based on a first preset; and in accordance with a determination the swimming pool is the second type, setting the criterion emphasis factors of the tracked swimmers based on a second preset.

In some embodiments, the receiving of the frames with the video camera and the identifying of the interior pool pixels, the background pixels, the foreground pixels, and the swimming pool information are performed concurrently.

In some embodiments, identifying the interior pool pixels, the background pixels and the foreground pixels further comprises identifying at least one of shape, size, color, and geometry of objects in the interior pool pixels, the background pixels and the foreground pixels.

In some embodiments, the system further comprises solar panels configured to charge the camera.

In some embodiments, the instructions further comprise storing the captured frames in the computing system.

In some embodiments, the computing system and the camera are configured to communicate wirelessly.

In some embodiments, the receiving of the frames with the video camera includes using one of real time streaming protocol (RTSP), HTTP, HTTPS, and SDP.

In some embodiments, the computing system is one of AI processor, cloud computing platform, a processor with AI and video/graphics booster technology having sufficient computation power and processing speed, a fast computing platform, and a parallel computing platform.

In some embodiments, the forming of the block for each swimmer comprises determining whether the block includes at least a threshold amount of foreground pixels.

In some embodiments, the instructions further comprises: identifying a difference between the background pixels at a first time and the background pixels at a second time, and dynamically updating the criterion based on the difference.

In some embodiments, the image tracking and motion prediction algorithms include at least one of Lucas-Kanade algorithm, Optical Flow Method, particle tracking, and Black-Jepson method.

In some embodiments, a first block associated with a first swimmer and a second block associated with a second swimmer at least partially overlap and form a third block, and the forming of the cluster of each swimmer further comprises using: a hierarchical k-means clustering algorithm to separate the first and second clusters, a Markov Random Field (MRF) to form the first and second clusters based on the identified background pixels, foreground pixels, and swimming pool information, and a linear prediction scheme to determine centroids of each swimmer by predicting direction and location of the swimmer.

In some embodiments, the instructions further comprise updating the criterion based on a user input.

In some embodiments, the instructions further comprise updating the criterion based on at least one of a Monte-Carlo simulation, user data, neural network data, and random forest data.

In some embodiments, determining whether the criterion is met further comprises determining a probability of the event based on a criterion emphasis factor associated with the tracked swimmer, and the instructions further comprise updating the criterion emphasis factors of the tracked swimmer based on at least one of a Monte-Carlo simulation and user data.

In some embodiments, the determination of whether a criterion is met for the tracked swimmer is further based on a probabilistic model.

In some embodiments, determining whether the criterion is met further comprises determining a probability of the event based on a criterion emphasis factor associated with the tracked swimmer, and the instructions further comprise determining whether the tracked swimmer is moving relative to a center of the tracked swimmer; in accordance with a determination that the tracked swimmer is moving relative to the center of the tracked swimmer, updating the criterion emphasis factors of the tracked swimmers; and in accordance with a determination that the tracked swimmer is not moving relative to the center of the tracked swimmer, forgoing updating the criterion emphasis factors of the tracked swimmers.

In some embodiments, the instructions further comprise determining the tracked swimmer is an animal based on at least a size, geometry, and movement of the animal, and in accordance with a determination that the tracked swimmer is the animal, the criterion is met.

In some embodiments, a method comprises: capturing, with a video camera, frames of a swimming pool; receiving the frames captured with the video camera; for each frame captured with the video camera, identifying: interior pool pixels associated with an interior region of the swimming pool in the frame, the interior pool region including a water area of the swimming pool, background pixels in the frame, foreground pixels in the frame, wherein the foreground pixels corresponds to detected foreground objects, and swimming pool information associated with objects in the frame; based on the identified background pixels, foreground pixels, and swimming pool information: forming a block for each swimmer in the foreground pixels, and tagging each swimmer in the frame with a respective identifier; tracking each swimmer by using image tracking and motion prediction algorithms on the formed blocks; determining, based on the swimming pool information and the image tracking and motion prediction algorithms whether a criterion is met for a tracked swimmer; and in accordance with a determination that the criterion is met for the tracked swimmer, generating a detection signal indicating an event associated with the tracked swimmer.

In some embodiments, the method further comprises determining a number of swimmers based on the interior pool and foreground pixels and the swimming pool information; detecting a swimmer leaving or entering the interior pool region; updating the number of swimmers based on the swimmer detection; determining that the swimmer entered the interior pool region after a predetermined amount of time; and in accordance with the determination that the swimmer entered the interior pool region after the predetermined amount of time, tagging the swimmer with an identifier; and in response to detecting the swimmer leaving the interior pool region, untagging the swimmer.

In some embodiments, the method further comprises determining a number of swimmers based on the interior pool and foreground pixels and the swimming pool information, wherein the criterion is met when a number of detected foreground objects is less than the number of swimmers.

In some embodiments, the method further comprises determining a number of swimmers based on the interior pool and foreground pixels and the swimming pool information, wherein the number of swimmers is a number of detected foreground objects.

In some embodiments, the criterion includes at least one of swimmer speed, swimmer posture, a splash threshold, an activity threshold, a submergence threshold, a submergence variance, and swimmer vertical movement.

In some embodiments, the method further comprises dynamically updating the criterion based on a depth corresponding to the swimmer's position in the swimming pool.

In some embodiments, the method further comprises dynamically updating the criterion based a distance of the swimmer from the camera.

In some embodiments, the method further comprises dynamically updating the criterion based on a surrounding brightness of a camera view.

In some embodiments, determining whether the criterion is met further comprises determining a probability of the event based on a criterion emphasis factor associated with the tracked swimmer, and the method further comprises: learning behaviors of the tracked swimmers; and updating the criterion emphasis factors of the tracked swimmers based on the learned behaviors.

In some embodiments, the method further comprises generating an alert associated with the event in response to the generated detection signal.

In some embodiments, the method further comprises transmitting the generated alert to a wearable device.

In some embodiments, the computing system comprises a user interface, and the method further comprises: selecting, on the user interface, an activity in the swimming pool; and updating the criterion based on the selected activity.

In some embodiments, the method further comprises determining whether the criterion is met further comprises determining a probability of the event based on a criterion emphasis factor associated with the tracked swimmer; selecting, on a user interface, a behavior of a tracked swimmer; and adjusting the criterion emphasis factors of the tracked swimmer based on the selected behavior.

In some embodiments, the method further comprises tracking a history of the swimming pool; learning site attributes of the swimming pool based on the history; and updating the criterion based on the learned site attributes.

In some embodiments, determining whether the criterion is met further comprises determining a probability of the event based on a criterion emphasis factor associated with the tracked swimmer, and the method further comprises: determining whether the swimming pool is a first type of swimming pool or a second type of swimming pool; in accordance with a determination that the swimming pool is the first type, setting the criterion emphasis factors of the tracked swimmers based on a first preset; and in accordance with a determination the swimming pool is the second type, setting the criterion emphasis factors of the tracked swimmers based on a second preset.

In some embodiments, the receiving of the frames with the video camera and the identifying of the interior pool pixels, the background pixels, the foreground pixels, and the swimming pool information are performed concurrently.

In some embodiments, identifying the interior pool pixels, the background pixels and the foreground pixels further comprises identifying at least one of shape, size, color, and geometry of objects in the interior pool pixels, the background pixels and the foreground pixels.

In some embodiments, the method further comprises using solar panels to charge the camera.

In some embodiments, the method further comprises storing the captured frames in a computing system.

In some embodiments, the computing system and the camera are configured to communicate wirelessly.

In some embodiments, wherein the computing system is one of AI processor, cloud computing platform, a processor with AI and video/graphics booster technology having sufficient computation power and processing speed, a fast computing platform, and a parallel computing platform.

In some embodiments, the receiving of the frames with the video camera includes using one of RTSP, HTTP, HTTPS, and SDP.

In some embodiments, the forming of the block for each swimmer comprises determining whether the block includes at least a threshold amount of foreground pixels.

In some embodiments, the method further comprises identifying a difference between the background pixels at a first time and the background pixels at a second time, and dynamically updating the criterion based on the difference.

In some embodiments, the image tracking and motion prediction algorithms include at least one of Lucas-Kanade algorithm, Optical Flow Method, particle tracking, and Black-Jepson method.

In some embodiments, a first block associated with a first swimmer and a second block associated with a second swimmer at least partially overlap and form a third block, and the forming of the cluster of each swimmer further comprises using: a hierarchical k-means clustering algorithm to separate the first and second clusters, a Markov Random Field (MRF) to form the first and second clusters based on the identified background pixels, foreground pixels, and swimming pool information, and a linear prediction scheme to determine centroids of each swimmer by predicting direction and location of the swimmer.

In some embodiments, the method further comprises updating the criterion based on a user input.

In some embodiments, the method further comprises updating the criterion based on at least one of a Monte-Carlo simulation, user data, neural network data, and random forest data.

In some embodiments, determining whether the criterion is met further comprises determining a probability of the event based on a criterion emphasis factor associated with the tracked swimmer, and the method further comprises updating the criterion emphasis factors of the tracked swimmer based on at least one of a Monte-Carlo simulation and user data.

In some embodiments, wherein the determination of whether a criterion is met for the tracked swimmer is further based on a probabilistic model.

In some embodiments, determining whether the criterion is met further comprises determining a probability of the event based on a criterion emphasis factor associated with the tracked swimmer, and the method further comprises: determining whether the tracked swimmer is moving relative to a center of the tracked swimmer; in accordance with a determination that the tracked swimmer is moving relative to the center of the tracked swimmer, updating the criterion emphasis factors of the tracked swimmers; and in accordance with a determination that the tracked swimmer is not moving relative to the center of the tracked swimmer, forgoing updating the criterion emphasis factors of the tracked swimmers.

In some embodiments, the method further comprises determining the tracked swimmer is an animal based on at least a size, geometry, and movement of the animal, and wherein in accordance with a determination that the tracked swimmer is the animal, the criterion is met.

In some embodiments, a non-transitory computer readable storage medium stores one or more programs, the one or more programs comprising instructions, which when executed by an electronic device with one or more processors and memory, cause the device to perform any of the above methods.

In some embodiments, a system includes: a video camera configured to capture frames of a swimming pool; a processor and a memory collocated with the video camera; a computing system configured to remotely communicate with the processor and memory; and a program stored in the memory, configured to be executed by the processor, and including instructions for: determining whether a swimmer is in the swimming pool; in accordance with a determination that the swimmer is in the swimming pool, transmitting an instruction to receive captured frames from the video camera and to transmit the captured frames to the computing system; and in accordance with a determination that the swimmer is not in the swimming pool, forgoing transmitting the instruction.

In some embodiments, transmitting the captured frames to the computing system includes transmitting the captured frames using a protocol for streaming in real-time.

In some embodiments, determining whether a swimmer is in the swimming pool includes: receiving frames from the video camera; identifying foreground pixels in the frames; and determining whether the identified foreground pixels correspond to the swimmer in the swimming pool.

In some embodiments, the computing system includes an Open Network Video Interface Forum (ONVIF)/RTSP bridge configured to receive the captured frames.

In some embodiments, the computing system is configured to wirelessly communicate with the video camera.

In some embodiments, the system further includes: an alarm configured to generate an alert associated with an event associated with the swimmer; and a router configured to wirelessly communicate with the computing system and the alarm over a first network connection.

In some embodiments, the router is configured to wirelessly communicate with the computing system and the alarm over the first network connection in accordance with a determination that the system is not connected to a second network.

In some embodiments, the program further includes instructions for: receiving, from a device, a request for frames from the video camera; and in response to receiving the request for the frames, transmitting a second instruction to receive the frames from the video camera and to transmit the frames to the device.

In some embodiments, the program further includes instructions for: receiving frames from the video camera; identifying an area of one of the frames including a threshold amount of pixels associated with the swimming pool; identifying a contour bordering the area in the one of the frames; and in accordance with a determination that the entire contour is within the frames, identifying the swimming pool from the frames.

In some embodiments, the pixels associated with the swimming pool are at least one of blue pixels and light green pixels.

In some embodiments, the program further includes instructions for in accordance with a determination that the entire contour is not within the frames, generating a request to reposition the video camera.

In some embodiments, the program further includes instructions for: in accordance with a determination that the swimming pool area of the frame includes less than the threshold mount of pixels associated with the swimming pool, generating a notification corresponding to the determination; and in accordance with a determination that the swimming pool area of the frame includes at least the threshold mount of pixels associated with the swimming pool, forgoing generating the notification corresponding to the determination.

In some embodiments, the system further includes a sensor configured to detect an angle and a distance of an object relative to the sensor. The swimming pool spans an angle range and a distance range relative to the sensor, and determining whether the swimmer in the swimming pool includes detecting, with the sensor, that the object is within the angle range and the distance range.

In some embodiments, the sensor is a passive infrared sensor (PIR) sensor includes a Fresnel lens.

In some embodiments, the program further includes instructions for: capturing the frames with the video camera; and identifying an area of one of the frames including a threshold amount of pixels associated with the swimming pool, wherein the angle range and the distance range correspond to the identified area.

In some embodiments, the area including the threshold amount of pixels are inside a contour of the swimming pool.

In some embodiments, the computing system includes a second processor and a second memory, and a second program is stored in the second memory, configured to be executed by the second processor, and including instructions for: receiving the captured frames; and determining, based on the received captured frames, occurrence of an event associated with the swimmer.

In some embodiments, the system further includes an alarm configured to generate an alert in response to receiving an event detection signal, wherein the second program includes instructions further for in accordance with a determination of the occurrence of the event, transmitting the event detection signal to the alarm.

In some embodiments of the above systems, the video camera includes the processor and the memory.

In some embodiments, a method includes steps the above systems are configured to perform.

In some embodiments, a non-transitory computer readable storage medium storing one or more programs, the one or more programs including instructions, which when executed by an electronic device with one or more processors and memory, cause the device to perform the above method.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Figure 1:
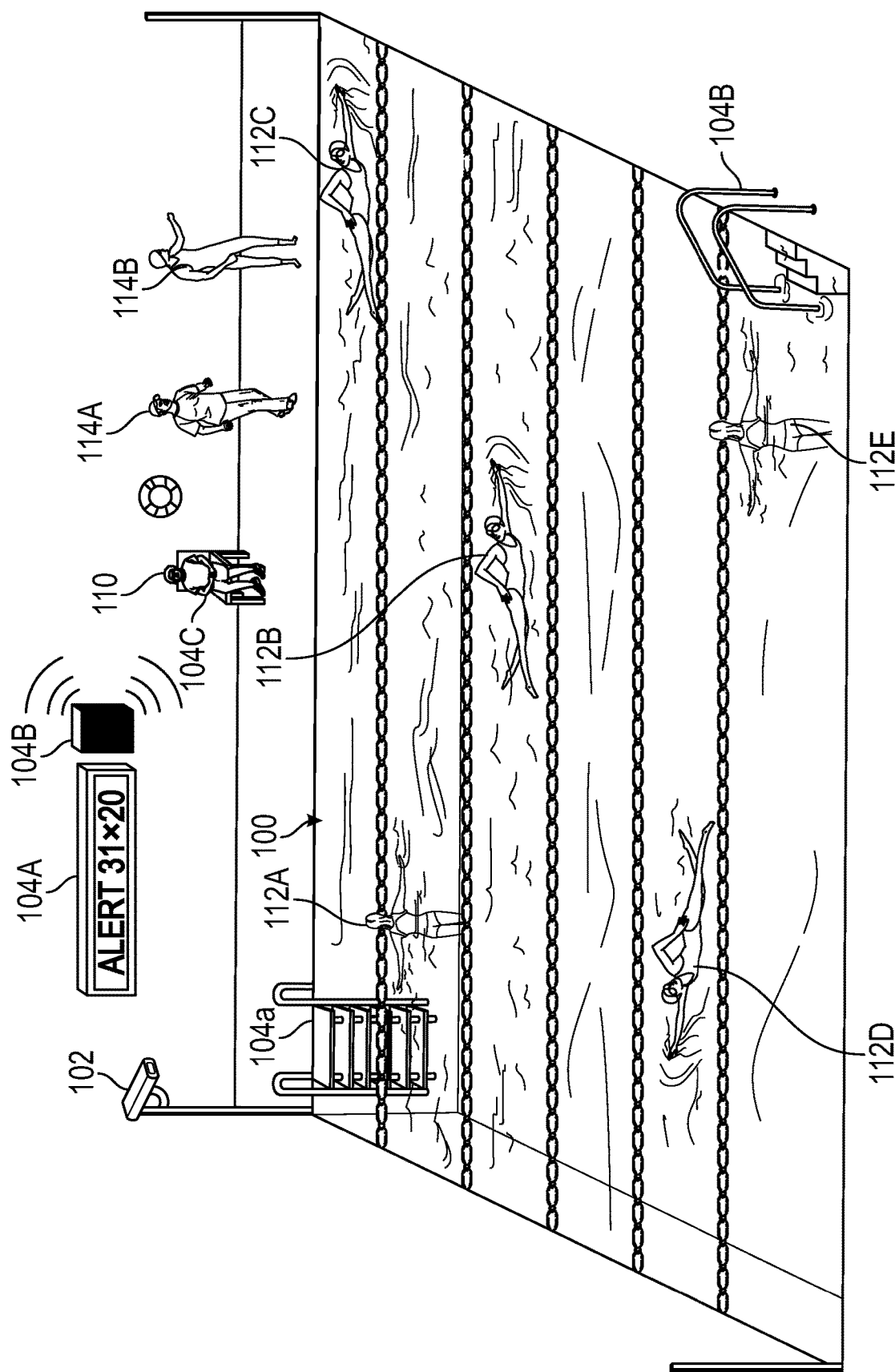
FIG. 1 illustrates an aquatic alert system, in accordance with an embodiment.

FIG. 1 illustrates an aquatic alert system, in accordance with an embodiment. In an example, the aquatic alert system may include camera 102 and alarm devices 104A, 104B, and 104C and may be installed in a facility that includes swimming pool 100. Although the aquatic alert system is illustrated to include one camera, it is understood that the aquatic alert system may include more than one camera without departing from the scope of the disclosure. The aquatic alert system may be used to help a safety personnel or a lifeguard better or more quickly determine whether someone is risk swimming, distress swimming, or drowning.

In some embodiments, the alarm device may be a display configured to visually alert occupants of the facility (e.g., lifeguard 110, swimmers 112, other occupants 114) that an event has been detected, in response to a generated detection signal. In some embodiments, the alarm device may be a speaker system configured to audibly alert occupants of the facility that an event has been detected, in response to a generated detection signal. In some embodiments, the alarm device may be a portable device (e.g., a smartwatch, a phone, a tablet) configured to alert (e.g., visual alert, audio alert, haptic alert) a user (e.g., lifeguard 110, a facility safety personnel, a facilities manager, a homeowner, a guardian of the swimmer involved in the event), in response to a generated detection signal. As used herein, a swimmer may be a body (e.g., a person, an animal) in the swimming pool.

In some embodiments, the camera 102 and the alarm devices 104A, 104B, and 104C may be connected over a wireless network (e.g., WiFi, a mobile network, an intranet) to communicate with a computing device (not shown) for processing data (e.g., video captured from the camera) and transmitting a detection signal to the alarm devices. In some embodiments, the camera 102 includes a processor and memory storing a program including instructions for the processor to process the data, analyze the data, and transmit the detection signal to the alarm devices. In some embodiments, the camera 102 includes a solar panel configured to charge a battery in the camera. In some embodiments, the camera 102 may be configured to be installed on a wall or a mount. In some instances, a lifeguard may not be able to monitor each swimmer in the swimming pool at all times (e.g., when the swimming pool is crowded, when staffing is low). The camera may advantageously assist the lifeguard by continuously monitoring the entire swimming pool. The aquatic alert system may advantageously determine an occurrence of an event (e.g., drowning) equal or quicker than the lifeguard's determination. For example, the system may detect a drowning swimmer quicker than the lifeguard because the lifeguard may be surveying portions of the pool at each time. In some embodiments, the camera is separate from a computing system configured to process images captured by the camera (e.g., the cameras are provided by the pool facilities, a separate off-the-shelf camera is used).

The facility may be indoor or outdoor. For example, the facility may be an indoor swimming pool, an outdoor swimming pool, a swimming pool in a private home, a spa, or an open body of water (e.g., a beach, ocean, lake, river). The event detection algorithm may vary depending on the facility (e.g., lighting conditions).

As an exemplary advantage, the disclosed aquatic alert system and methods of operating the aquatic alert system allow the system to monitor the swimming pool continuously in real-time (e.g., 24x7 monitoring), to be trained without supervision, to accurately recognize all swimmers, to accurately track all swimmers, and to detect an event (e.g., a drowning event, risk swimming, distress event) and provide an alarm accurately (e.g., low false alarm rates) and quickly (e.g., faster than a scenario with lifeguards and without this system).

For example, the disclosed aquatic alert system may detect a drowning event in less than 10 seconds, increasing the chance that the drowning swimmer can be rescued without harm. As yet another exemplary advantage, when used in conjunction with lifeguards, the system may increase a percentage of successful rescue from 16% to above 80%.

Figure 2:
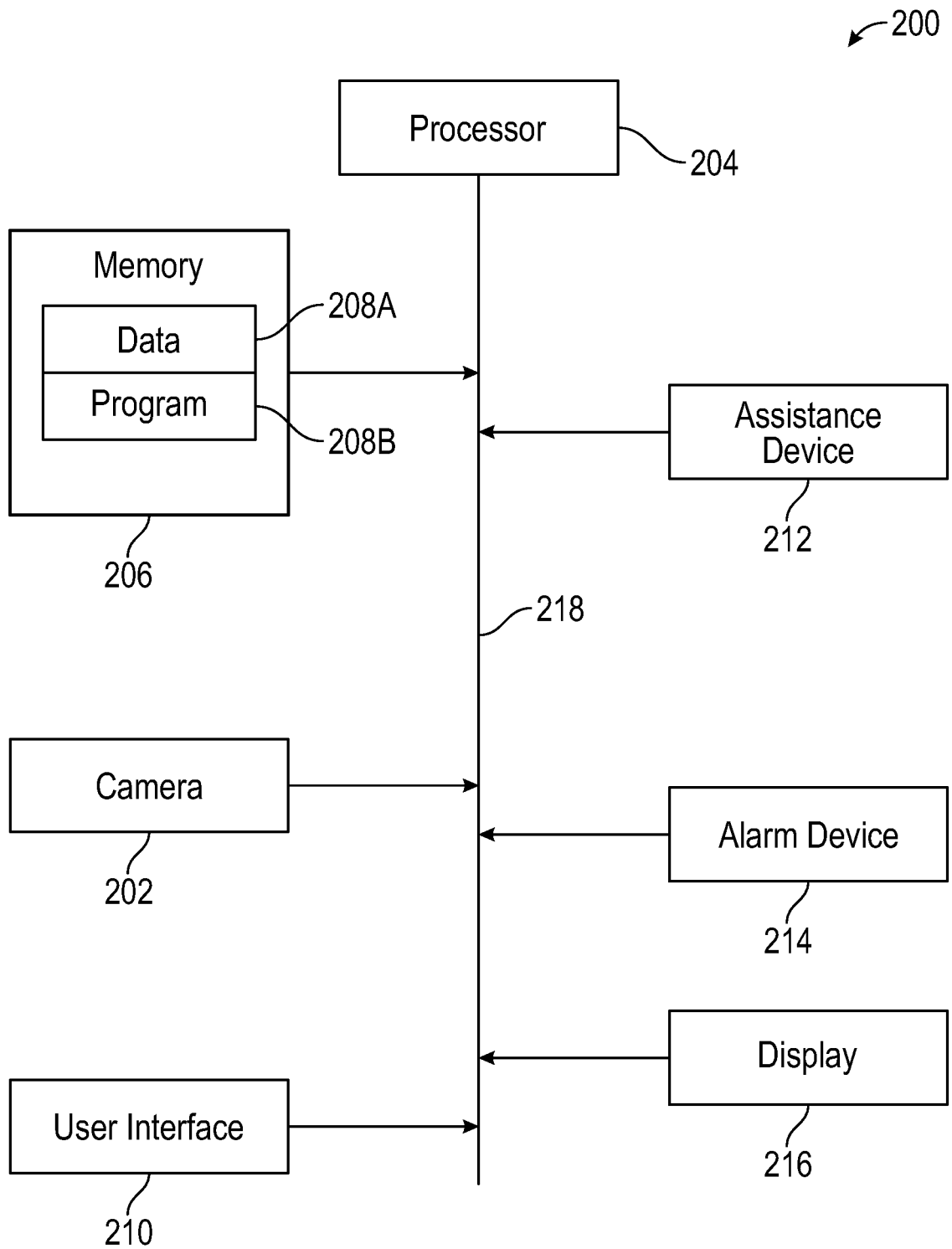
FIG. 2 illustrates an aquatic alert system, in accordance with an embodiment.

FIG. 2 illustrates an aquatic alert system 200, in accordance with an embodiment. The aquatic alert system 200 may be used in the facilities disclosed herein.

In some embodiments, the aquatic alert system 200 includes camera 202, processor 204, memory 206, user interface 210, assistance device 212, alarm device 214, and display 216. Elements of the aquatic alert system 200 may be connected with communication link 218. In some embodiments, the communication link 218 is wireless. For example, the communication link 218 represents a wireless network, and the wireless network includes a wireless router. As another example, the communication link 218 may be a WiFi, Bluetooth, or mobile network (e.g., 4G, LTE, 5G). As yet another example, the communication link 218 may be a wired link.

Elements of the aquatic alert system 200 may be included in subsystems. For example, the processor 204 and memory 206 may be included in a computing device (e.g., a computer, a server, a cloud computing device), separate from the other elements, where data (e.g., video frames) from the camera 202 is processed and analyzed and a detection signal to activate the alarm device may be transmitted, depending on the analysis. In some embodiments, the computing device transmits a video stream in response to receiving a query from an application of another device. In some embodiments, the computing system and the camera are configured to communicate wirelessly. In some embodiments, the computing device is one of AI processor, cloud computing platform, a processor with AI and video/graphics booster technology having sufficient computation power and processing speed, a fast computing platform, and a parallel computing platform. In some embodiments, the aquatic alert system 200 includes a first computing device (e.g., a base station, a computer) in a same local network as the camera 202 for initially processing video frames from the camera and a second computing device not in the local network (e.g., a server, a cloud computing device) for subsequently processing the video frames and transmitting a video stream in response to receiving a query from an application of a third device. By performing the processing and analysis in a computing device instead of the camera, the complexity and cost of the camera (and hence the cost of the system) may be advantageously reduced.

As another example, the processor 204 and memory 206 may be included in the camera 202. That is, the processing and analysis of data (e.g., video frames) received from the camera 202 may be performed by the camera itself without a separate computing device. Depending on the analysis, the camera 202 may transmit a detection signal to the assistance device 212 and/or alarm device 214 (e.g., a swimmer is determined to be drowning, and the camera transmits the signal to activate the assistance device 212 and/or alarm device 214). As yet another example, the aquatic alert system 200 may not include a camera, and the camera is separate from elements (e.g., elements of a computing system) configured to process images captured by the camera (e.g., the cameras are provided by the pool facilities, a separate off-the-shelf camera is used).

The aquatic alert system 200 may be used as illustrated in FIG. 1. For example, camera 202 may be camera 102 and alarm device 214 may be at least one of alarm devices 104. The alarm device 214 may provide a visual, audio, or haptic alert indicating that a swimmer is drowning. For example, as described herein, based on whether a criterion is met (described in more detail below), the system generates a detection signal that causes an alarm device 214 to present an alarm (e.g., to a lifeguard, to a safety personnel, to a guardian of the drowning swimmer, to a facilities manager, to a homeowner). The aquatic alert system may advantageously determine an occurrence of an event (e.g., drowning) and generate an alert equal or quicker than the lifeguard's determination. For example, the system may detect a drowning swimmer quicker than the lifeguard because the lifeguard may be surveying portions of the pool at each time. As a result, the lifeguard may be able to act accordingly (e.g., help the drowning swimmer) quickly.

In some examples, the assistance device 212 may be a life saving device (e.g., a rescue robot, the EMILY Hydronalix Rescue Robot) or a buoyancy device (e.g., a device that can lift a person experiencing a drowning event above the water). In some embodiments, the assistance device 212 is activated or made available to a user of the system (e.g., a lifeguard, a safety personnel, a facilities manager, a homeowner, a guardian of the drowning swimmer) in response to generation of a detection signal (e.g., the system determines that someone is drowning, and the system activates or makes the assistance device available to rescue the actively drowning swimmer).

In some embodiments, the display 216 may be a touch screen and configured to display the user interface 210. In some embodiments, the user interface 210 is separately presented from the display 216. The user interface 210 may be configured to receive an input from a user (e.g., a touch input, a button input, a voice input), and a setting of the system may be updated in response to receiving the input from the user. Methods of operating the user interface 210 is described in more detail with respect to FIG. 3. As an exemplary advantage, the user interface allows a user to efficiently configure the system and customize a likelihood of event detection based on the user's requirements.

In some examples, the display 216 may be integrated with the camera 202. In some examples, the display 216 may be included with a computer system that includes processor 204 and memory 206. In some examples, the display 216 may be a device separate from the camera 202, processor 204, and memory 206.

In some embodiments, the memory 206 includes data 208A and program 208B. The data 208A and/or program 208B may store instructions to cause the processor 204 to perform the methods disclosed herein (e.g., methods of operating the aquatic alert system 200, method 300). In some examples, the data 208A is part of a storage system of a computer system or an online storage system, and the captured frames are stored in a storage system of the computer system or an online storage system.

Figure 3:
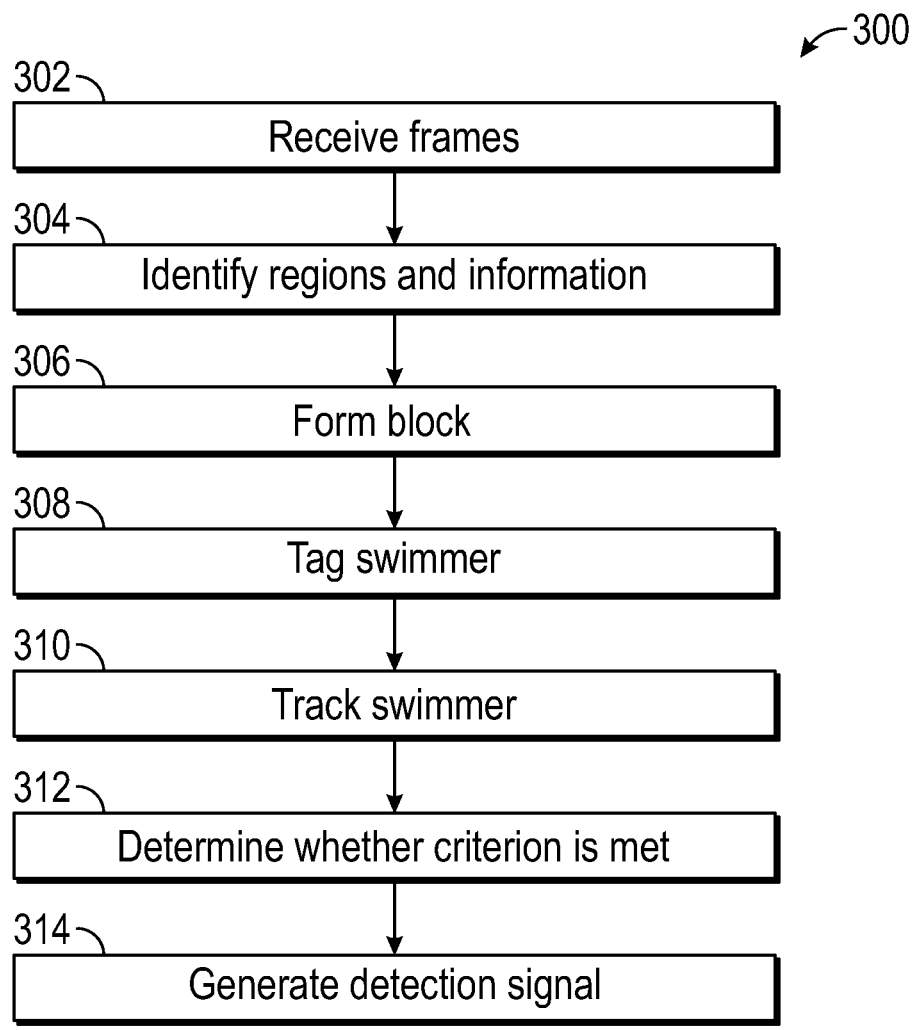
FIG. 3 illustrates a method of operating an aquatic alert system, in accordance with an embodiment.

FIG. 3 illustrates a method 300 of operating an aquatic alert system, in accordance with an embodiment. In some embodiments, the method 300 is performed with a system comprising a video camera configured to capture frames of a swimming pool (e.g., camera 102, camera 202), a computing system configured to communicate with the camera and including a processor and memory (e.g., as described with respect to FIGS. 1, 2, and 4); and a program stored in the memory, configured to be executed by the processor and including instructions to perform the method.

In some embodiments, the method 300 includes step 302, receiving the frames captured with the video camera. For example, the camera 102 or camera 202 receives frames of a video feed of the swimming pool.

In some embodiments, the receiving of the frames with the video camera and the identifying of the interior pool pixels, the background pixels, the foreground pixels, and the swimming pool information are performed concurrently (e.g., sliding window method to process video). For example, the background pixels, foreground pixels, and the swimming pool information may be identified using a real-time streaming video of swimming pool. For example, the receiving of the frames with the video camera may include using one of RTSP, HTTP, HTTPS, and SDP with secure data transmission using encryption and authentication methods such as WPA, WPA2, TKIP, or AES. In some embodiments, the interior pool pixels are associated with an interior pool region in the frame. In some embodiments, the background pixels are associated with a background region (e.g., a portion of the frame associated with background objects of the pool) in the frame. In some embodiments, the foreground pixels are associated with a foreground region (e.g., swimmers) in the frame.

By processing the video in real-time, the system may advantageously assist the lifeguard by continuously and instantaneously monitoring the entire swimming pool. The aquatic alert system may advantageously determine an occurrence of an event (e.g., drowning) equal or quicker than the lifeguard's determination. For example, the system may detect a drowning swimmer quicker than the lifeguard because the lifeguard may be surveying portions of the pool at each time.

In some embodiments, the method 300 includes storing the captured frames in the computing system. For example, the captured frames are stored in a storage system of the computer system or an online storage system.

In some embodiments, the method 300 includes step 304, for each frame captured with the video camera, identifying interior pool pixels associated with an interior region of the swimming pool in the frame, the interior pool region including a water area of the swimming pool, background pixels (e.g., associated with the swimming pool) in the frame, foreground pixels (e.g., associated with the swimming pool) in the frame, wherein the foreground pixels correspond to detected foreground objects, and swimming pool information associated with objects in the frame. In some examples, the interior pool region may be defined by a perimeter (e.g., the pool's perimeter) surrounding the foreground objects (e.g., swimmers, people, animals, birds, objects active in a frame) and the background objects (e.g., water, static objects). For example, for each of the received frames from the camera, background pixels or region (associated with e.g., facility objects such as ladder 104, lane dividers, equipment, other occupants 114), foreground pixels or region (associated with e.g., swimmers 112), and swimming pool information (e.g., number of swimmers, facilities attributes) are identified. As another example, lane dividers may be removed based on their color and orientation with respect to the swimming pool (e.g., horizontal/vertical) and by applying a high pass filter across this orientation. Other static objects may be removed based on stationary (e.g., substantially zero speed) movement of objects (e.g., tubes, buoyant objects, metal objects). In some embodiments, although the other occupants 114 may not be in the foreground pixels, they may be tracked by the system; an alert may be generated if the other occupant 114 falls into the swimming pool, based on this tracking. In some embodiments, the background pixels may be a mean of background pixels accumulated over a number of samples (e.g., 10 consecutive samples) to account for dynamic background changes (e.g., a diving board is part of the background, but may be moving in some frames, but not others).

As yet another example, a skin complexion model may first be applied to isolate swimmer pixels (e.g., foreground pixels, pixels in foreground region) from the background pixels. Residue swimmer pixels may be removed using a temporal vector median filter. In contrast with modeling each pixel independently, the background pixels may be formed by block (e.g., cluster) centroids of homogeneous color regions within blocks of the background pixels. For example, a hierarchical k-means within each block is used.

In some embodiments, identifying the interior pool pixels, the background pixels and the foreground pixels further comprises identifying at least one of shape, size, color, and geometry of objects in the interior pool pixels, the background pixels and the foreground pixels. For example, background objects such as lane divider, ladder, and diving board may be identified based on successive frames and motion tracking of objects in the pool and/or size determination of objects in case of larger/taller objects. This step may advantageously allow the system to correctly identify swimmers and background objects, reducing the likelihood of a false alarm (e.g., mistaking a background object as a drowning swimmer) or a missed event (e.g., not tracking a drowning swimmer).

In some embodiments, the method 300 includes step 306, based on the identified background pixels, foreground pixels, and swimming pool information, forming a block (e.g., cluster) for each swimmer in the foreground pixels.

For example, background pixels may be divided into blocks. In each block, a k-means clustering algorithm may be applied to get a number of block (e.g., cluster) centroids. In every arriving frame, for every pixel, distance from a pixel to block (e.g., cluster) centroids in the block the pixel belongs to, and surrounding blocks (e.g., eight blocks) is calculated. If eight blocks are calculated, a minimum of nine distances is chosen as color discrepancy of a pixel.

In the resulting discrepancy image, hysteresis thresholding may be applied to segment the foreground from the background. That is, a pixel may belong to foreground if it is of greater discrepancy than a value $T_1$, and if it is a part of a region of other such pixels (e.g., a part of other background pixels, the region including at least one pixel of discrepancy greater than the value $T_1$).

Then, the foreground may be separated, and be divided into blocks. K-means algorithm may be used to find block (e.g., cluster) centroids in each block. This may be performed for every arriving frame.

Similar to thresholding for identifying background pixels, color discrepancy may be measured for every pixel and its surrounding foreground blocks. Pixels with high discrepancy may be labeled as highest confidence swimmer pixels (e.g., foreground pixels).

In some embodiments, the forming of the block (e.g., cluster) for each swimmer comprises determining whether the block (e.g., cluster) includes at least a threshold amount of foreground pixels. For example, a block (e.g., cluster) would be formed if a portion of the block includes a threshold percentage of foreground pixels (e.g., skin color pixels, pixels identified as potentially being a swimmer pixel), and a block (e.g., cluster) would not be formed if the portion does not include the threshold percentage of foreground pixels. This step may advantageously allow the system to correctly identify and track swimmers, reducing the likelihood of a false alarm (e.g., mistaking that a non-drowning swimmer is drowning) or a missed event (e.g., not tracking a drowning swimmer).

In some embodiments, the method 300 includes step 308, based on the identified background pixels, foreground pixels, and swimming pool information, tagging each swimmer in the frame with a respective identifier. For example, each swimmer (e.g., each of swimmers 112) is assigned a unique identifier such as a tag or a number.

In some embodiments, the method 300 includes step 310, tracking each swimmer by using image tracking and motion prediction algorithms on the formed blocks (e.g., clusters). For example, the image tracking and motion prediction algorithms may include at least one of Lucas-Kanade algorithm, Optical Flow Method, particle tracking, and Black-Jepson method. The swimmer's movement may be tracked or predicted using an initial speed and direction of the swimmer. A system performing these steps may advantageously quickly track swimmers and reduce a lifeguard's reaction to an event.

In some embodiments, the method 300 includes step 312, determining, based on the swimming pool information and the image tracking and motion prediction algorithms whether a criterion is met for a tracked swimmer. For example, the criterion may include at least one of swimmer speed, swimmer posture, (e.g., based on the angle of the principle axis of a best fit ellipse enclosing a swimmer), a splash threshold (e.g., a threshold number of splash pixels inside a bounding box associated with the swimmer), an activity threshold (e.g., a threshold cumulative area of pixels covered by a swimmer over a defined period of time), a submergence threshold (e.g., a threshold percentage of a swimmer's body inside the water), a submergence variance, and swimmer vertical movement, as calculated from the camera frame. The criterion may also include at least one of swimmer speed (e.g., based on difference in centroid positions computed over a small period, using image tracking motion prediction algorithms), submersion variance (e.g., variance of submersion indicating the submersion behavior of the swimmer), and swimmer vertical movement. The criterion may be user defined (e.g., the system is trained offline) or learned by the system over time (e.g., real-time event inference).

For example, the criterion may be met when a splash threshold is exceeded by a swimmer splashing beyond a threshold amount while drowning and the criterion is met. As another example, the criterion may be met when an angle of a best fit ellipse enclosing a swimmer indicates that the body of the swimmer is in a non-swimming posture (e.g., drowning). As yet another example, the criterion may be met when an activity of a swimmer suddenly changes (e.g., a swimmer's movement suddenly stops or a swimmer's movement suddenly become swift, indicating that the swimmer may be drowning, a swimmer's hair is over his or her eyes, a swimmer is not using his or her legs, a swimmer is trying to swim in a direction but not moving in the direction, a swimmer is trying to roll over onto his or her back, the swimmer appears to be climbing an invisible ladder). As yet another example, the criterion may be met when greater than a threshold percentage of the swimmer's body is submerged underwater over a defined period of time (e.g., a swimmer is under the water for too long, a swimmer's head is low in the water). By using a criterion to determine an occurrence of an event, the event may be accurately and consistently detected (e.g., different lifeguards may have a different determination of whether a swimmer requires assistance at different time; a lifeguard may misjudge a drowning event, diverting his or her attention away from other swimmers).

In some embodiments, the method 300 includes step 314, in accordance with a determination that the criterion is met for the tracked swimmer, generating a detection signal indicating an event associated with the tracked swimmer. For example, the detection signal indicates that a swimmer is drowning or an animal has fallen into the swimming pool. In some embodiments, more than one criterion or a combination of criterion may need to be met to generate the detection signal. For example, a generalized reduced multivariable polynomial (GRM) network may be used to combine the criterion to determine whether a detection signal should be generated.

In some embodiments, the method 300 includes generating an alert associated with the event in response to the generated detection signal. For example, the detection signal causes an alarm or an alert (e.g., lifeguard 110, a guardian, a safety personnel) that expresses someone may be drowning. For example, the alert may be generated on a wearable device, a portable device, or a system user interface. In some examples, multiple alerts may be generated on multiple devices. In some embodiments, the system comprises a wearable device (e.g., alarm device 104C, a smart watch wore by lifeguard 110, a wearable device worn by an external supervisor), and the method 300 includes transmitting the generated alert to the wearable device.

As an exemplary advantage, the method 300 may allow detection of a drowning event in less than 10 seconds, increasing the chance that the drowning swimmer maybe rescued without harm. As another exemplary advantage, when used in conjunction with lifeguards, the system 200 and the method 300 may increase a percentage of successful rescue from 16% to above 80%.

In some embodiments, the method 300 includes determining a number of swimmers based on the interior pool and foreground pixels and the swimming pool information, detecting a swimmer leaving or entering the interior pool region, updating the number of swimmers based on the detection; determining that the swimmer entered the interior pool region after a predetermined amount of time; in accordance with the determination that the swimmer entered the interior pool region after the predetermined amount of time, tagging the swimmer with an identifier; and in response to detecting the swimmer leaving the interior pool region, untagging the swimmer. For example, a number of the swimmer at a given time is determined based on the foreground pixels (e.g., number of blocks or clusters, number of tagged swimmers) or the swimming pool information (e.g., number of tagged swimmer at a time prior to the given time). At a subsequent time, a new swimmer entering the swimming pool may be detected (e.g., based on the identification step) and tagged in response to the detection. At a subsequent time, a swimmer leaving the swimming pool may be detected (e.g., based on the identification step) and untagged in response to the detection.

As an exemplary advantage, by keeping track of the number of swimmer in the swimming pool, false negatives may be eliminated under low visibility conditions (e.g., no clear water, nighttime). If a current swimmer count is lower than a previous swimmer count and the system determines that no swimmer has left the swimming pool (indicating that, e.g., a swimmer may be submerged underwater, drowning, and not visible to the camera), then a criterion is met and a detection signal is generated.

In some embodiments, the method 300 includes determining a number of swimmers based on the foreground pixels and the swimming pool information, and the criterion is met when a number of detected foreground objects is less than the number of swimmers. For example, a total number of swimmers at given time may be based on the number of detected foreground objects (e.g., identified blocks, clusters, active objects) and swimming pool information such as total number swimmers at a time prior to the given time. If partial occlusion or occlusion is determined between at least two blocks (e.g., clusters), then the number of swimmers is determined to less be the number of identified blocks (e.g., clusters) (e.g., due to partial occlusion or occlusion, one cluster may include more than one swimmer). The system may advantageously determine more accurately the number of swimmer even with partial occlusion or occlusion in the frame.

In some embodiments, the method 300 includes determining a number of swimmers based on the interior pool and foreground pixels and the swimming pool information, and the number of swimmers is a number of detected foreground objects (e.g., detected blocks, clusters, active objects). For example, a total number of swimmers at a given time may be determined by the number of identified blocks (e.g., clusters) and swimming pool information such as total number of swimmers at a time prior to the given time. If there is no partial occlusion or occlusion between the blocks (e.g., clusters), then the number of swimmers is determined to be the number of identified blocks (e.g., clusters).

In some embodiments, the criterion dynamically updates based on a depth (e.g., of the swimming pool) corresponding to the swimmer's position in the swimming pool. For example, if the swimmer is at a shallower or deeper portion of the swimming pool, then the submergence threshold may be dynamically updated accordingly. For example, a percentage threshold may be higher for a swimmer at a shallower portion of the swimming pool.

In some embodiments, the criterion dynamically updates based on a distance of the swimmer from the camera. For example, if a swimmer is at a further distance from the camera, resolution of the swimmer may be reduced, and the criterion may be updated to be more conservative (e.g., the threshold meeting the criterion may be lower). In some embodiments, the criterion dynamically updates based on a surrounding brightness of a camera view.

In some embodiments, determining whether the criterion is met further comprises determining a probability of the event based on a criterion emphasis factor associated with the tracked swimmer, and the method 300 includes learning behaviors of the tracked swimmers; and updating the criterion emphasis factors of the tracked swimmers based on the learned behaviors (e.g., swimmer skill, risk level of swimming). For example, the criterion emphasis factor may be an adjustment factor (e.g., a numerical weight) associated with a criterion that affects how likely the criterion is met. As one example, over time (e.g., after 15 minutes), the system may learn that the tracked swimmer is a strong swimmer, and the criterion emphasis factor may deemphasize the criterion (e.g., setting higher thresholds determining whether the swimmer is drowning). As another example, over time, the system may learn that the tracked swimmer is a weak swimmer (e.g., a beginner), and the criterion emphasis factor may emphasize the criterion (e.g., setting lower thresholds for determining whether the swimmer needs assistance). A system that determines an event occurrence using a criterion emphasis factor may be more robust by allowing configuration of a corresponding criterion based on learned behaviors or user inputs (e.g., compare to a system that does not allow variability of event detection parameters).

In some embodiments, the height of a swimmer may be determined, and the criterion emphasis factor may be updated based on the height of the swimmer. For example, the height of the swimmer indicates that the swimmer may be a child; the criterion emphasis factor may be emphasized for higher sensitivity (e.g., the child may be more likely to drown). In some embodiments, the criterion may be deemphasized when a relatively tall swimmer passes over a relatively shallow part of the pool.

In some embodiments, the computing system comprises a user interface, and the method 300 includes selecting, on the user interface, an activity in the swimming pool; and updating the criterion based on the selected activity. For example, the user interface may be presented on a display (e.g., display 216) of the system, and a user (e.g., a lifeguard, a home owner, an administrator) may select a current activity associated with the swimming pool (e.g., free swim, a supervised swimming class, swim meet, kids swimming lesson, scuba lessons, day, night) on the user interface. Based on the selected activity and a risk of drowning associated with the activity, the criterion may be updated. For example, the risk of drowning during a free swim may be higher than the risk of drowning for a swim meet; the criterion associated with the free swim may be more conservative (e.g., drowning detection may be more sensitive) than the criterion associated with the swim meet. As yet another example, a user may not want anyone in the swimming pool at night or may have reduced supervision at night; therefore, the criterion associated with night-time may be more conservative or sensitive than the criterion associated with day-time.

In some embodiments, the computing system comprises a user interface, and determining whether the criterion is met further comprises determining a probability of the event based on a criterion emphasis factor associated with the tracked swimmer, and the method 300 includes selecting, on the user interface, a behavior of a tracked swimmer; and adjusting the criterion emphasis factors of the tracked swimmer based on the selected behavior. For example, the user interface may be presented on a display (e.g., display 216) of the system, and a user (e.g., a lifeguard, a home owner, an administrator) may select a behavior of a tracked swimmer (e.g., the tracked swimmer is an advanced swimmer, the tracked swimmer is a beginner). Based on the selected behavior, the emphasis factor may be updated. For example, the risk of drowning for a beginner may be higher than the risk of drowning for a more advanced swimmer; the criterion associated with the beginner may be more conservative (e.g., drowning detection may be more sensitive) than the criterion associated with the advanced swimmer.

In some embodiments, the method 300 includes tracking a history of the swimming pool, learning site attributes of the swimming pool based on the history, and updating the criterion based on the learned site attributes. For example, events and conditions of the swimming pool may be tracked over time, and the site attributes may be parameters associated with the swimming pool (e.g., indoor pool parameters, outdoor pool parameters, brightness, air quality, glare, water color, lanes or other static objects, paint color on pool floor). Based on the tracked history and the learned site attributes, the criterion is updated accordingly to more accurately reflect a risk of drowning associated with the particular swimming pool. As an exemplary advantage, by updating the criterion based on the learned site attributes, the system may better adapt to changing pool conditions without manual updates or calibrations.

In some embodiments, determining whether the criterion is met further comprises determining a probability of the event based on a criterion emphasis factor associated with the tracked swimmer, and the method 300 includes determining whether the swimming pool is a first type of swimming pool or a second type of swimming pool, in accordance with a determination that the swimming pool is the first type, setting the criterion emphasis factors of the tracked swimmers based on a first preset, and in accordance with a determination the swimming pool is the second type, setting the criterion emphasis factors of the tracked swimmers based on a second preset. For example, the criterion emphasis factor may be an adjustment factor (e.g., a numerical weight) associated with a criterion that affects how likely the criterion is met. The system may include presets of predetermined criterion and criterion emphasis factors associated with different types of swimming pool (e.g., indoor pool, outdoor pool, large swimming pool, small swimming pool, swimming pool including a diving board). A preset of these predetermined criterion and criterion emphasis factors may be selected (e.g., by the user, by the system based on image analysis of the pool) based on the type of swimming pool. As an exemplary advantage, by having these presets, the initial tuning process of the system may be reduced (e.g., short installation time).

In some embodiments, identifying a difference between the identified background pixels at a first time and the identified background pixels at a second time, and the method 300 includes dynamically updating the criterion based on the difference. For example, the system determines that background pixels are different between a first time and a second time because swimming pool set up may be different. As an example, the setup at the first time may be a swim meet, and the second up at the second time may be a free swim. As another example, the setup of the swimming pool may have been renovated over time. In response to identifying the difference, the system dynamically updates a criterion associated with the first setup (e.g., the swim meet, setup before pool renovation) to a criterion associated with the second setup (e.g., the free swim, setup after pool renovation). As an exemplary advantage, less manual tuning and more accuracy may be achieved by using the system to automatically identify these background differences.

In some embodiments, a first block (e.g., cluster) associated with a first swimmer and a second block (e.g., cluster) associated with a second swimmer at least partially overlap and form a third block (e.g., cluster), and the forming of the block (e.g., cluster) of each swimmer further comprises using a hierarchical k-means clustering algorithm to separate the first and second blocks (e.g., clusters), a Markov Random Field (MRF) to form the first and second blocks (e.g., clusters) based on the identified background pixels, foreground pixels, and swimming pool information, and a linear prediction scheme to determine centroids of each swimmer by predicting direction and location of the swimmer.

For example, two swimmers (e.g., two swimmers with unique identifiers or tags) merge as one identified foreground object (e.g., one combined third block or cluster). The newly formed block or cluster (e.g., the third block or cluster) is now searched for k-means with two sub-blocks or sub-clusters (e.g., searching for the first and second blocks or clusters based on history, swimming pool information, tracking knowledge) and the clustering algorithm may give the two independent swimmers as an output, even if the third block (e.g., cluster) appears to be one block (e.g., cluster). MRF may break that one block or cluster (e.g., the third block or cluster) into two swimmer based on body shape and background water separation. Linear prediction scheme may predicts where (e.g., direction, location) the swimmer may be swimming to identify swimmer's centroids and to potentially better track the centroids. Each swimmer may be more accurately identified by forming the sub-blocks or sub-clusters.

In some embodiments, the method 300 includes updating the criterion based on a user input. For example, the system may include a user interface, and using the user interface, the user may be able to manually adjust a criterion (e.g., manually adjusting threshold levels associated with meeting the criterion to generate the detection signal and an alert).

In some embodiments, the method 300 includes updating the criterion based on at least one of a Monte-Carlo simulation, user data, neural network data, and random forest data. For example, the system may be trained unsupervised using Monte-Carlo simulation training videos or graphics of normal swimming and drowning behaviors, and criterion may be updated based on the unsupervised training, potentially reducing manual tuning of the system and increasing accuracy of detection. As another example, the system may be trained unsupervised using data (e.g., usage data, event occurrence data) from users (e.g., a same user, other users) of the aquatic alert system. As yet another example, the system may be trained unsupervised using data-based methods such as neural networks or random forests.

In some embodiments, determining whether the criterion is met further comprises determining a probability of the event based on a criterion emphasis factor associated with the tracked swimmer, and the method 300 includes updating the criterion emphasis factors of the tracked swimmer based on at least one of a Monte-Carlo simulation and user data. For example, the criterion emphasis factor may be an adjustment factor (e.g., a numerical weight) associated with a criterion that affects how likely the criterion is met. The system may be trained unsupervised using Monte-Carlo simulation training videos or graphics of normal swimming and drowning behaviors, and criterion emphasis factor may be updated based on the unsupervised training, potentially reducing manual tuning of the system and increasing accuracy of detection. As another example, the system may be trained unsupervised using data (e.g., usage data, event occurrence data) from users (e.g., a same user, other users) of the aquatic alert system, and criterion emphasis factor may be updated based on the unsupervised training, potentially reducing manual tuning of the system and increasing accuracy of detection.

In some embodiments, the determination of whether a criterion is met for the tracked swimmer is further based on a probabilistic model. For example, training using an artificial neural network (ANN) based on a Gaussian or Bayesian probabilistic models to evaluate drowning confidence level associated with a probability of drowning may be used to determine whether the criterion is met. As another example, the probabilistic model is built based on ground truth. The model may allow the system to more accurately determine an occurrence of an event.

In some embodiments, determining whether the criterion is met further comprises determining a probability of the event based on a criterion emphasis factor associated with the tracked swimmer, and the method includes determining whether the tracked swimmer is moving relative to a center of the tracked swimmer; in accordance with a determination that the tracked swimmer is moving relative to the center of the tracked swimmer, updating the criterion emphasis factors of the tracked swimmers; and in accordance with a determination that the tracked swimmer is not moving relative to the center of the tracked swimmer, forgoing updating the criterion emphasis factors of the tracked swimmers. For example, the criterion emphasis factor may be an adjustment factor (e.g., a numerical weight) associated with a criterion that affects how likely the criterion is met. A movement of a tracked swimmer is identified. For example, the movement of the tracked swimmer includes movement relative to the center of the tracked swimmer (e.g., the limbs of the swimmer are moving relative to the center of the swimmer, the swimmer is moving in a bounded box). In accordance with a determination that the tracked swimmer is moving relative to the center of the tracked swimmer, the criterion emphasis factors of the tracked swimmers are updated because the associated foreground object is more likely to be a swimmer (e.g., an inanimate object is less likely to be moving relative to its center). As an exemplary advantage, if other features are insufficient (e.g., confidence is low) to determine other foreground objects from active objects (e.g., people, animals, etc.), determining whether a swimmer is moving relative to a center or whether a swimmer is moving in a bounded box and updating a criterion emphasis factor in accordance with the determination increase swimmer or active object identification confidence.

In some examples, a person determined to be not wearing swimwear (e.g., other occupant 114A) falling into the swimming pool may be associated with a more emphasized criterion emphasis factor because it is more likely that this person is drowning. If the outfit is in a non-human skin color, it may be identified using RGB color thresholding. For example, outfits such as wet-suits and swimsuits may be identified due to their stark contrast such as black, blue, and red. As another example, a person wearing or not wearing a swim cap may be identified by the person's head geometry and color (e.g., head shape, color of the top of the swimmer's head). As an exemplary advantage, a swimmer may be more accurately determined, and misidentification of swimmers may be reduced.

In some embodiments, the method 300 includes determining the tracked swimmer is an animal based on at least a size, geometry, and movement of the animal, and in accordance with a determination that the tracked swimmer is the animal, the criterion is met. For example, the system may be trained to identify animals based on differentiating features such as size, shape, structure (e.g., tail, legs), and complexity. As another example, an animal is determined based on the movement of a foreground object relative to a center of the foreground object (e.g., the limbs of the animal are moving relative to the center of the animal, the limbs of the animal are moving within a bounded box). If an animal is determined to fall into water, an alarm (as disclosed herein) may be generated in response. In some embodiments, in response to a selection on a user interface, the system may forgo generating an alarm when an animal is determined to be in the swimming pool (e.g., a dog may be able to swim in the swimming pool). As an exemplary advantage, if other features are insufficient (e.g., confidence is low) to determine other foreground objects from an animal, determining whether the animal is moving relative to a center or whether the animal is moving in a bounded box increases animal identification confidence.

Figure 4:
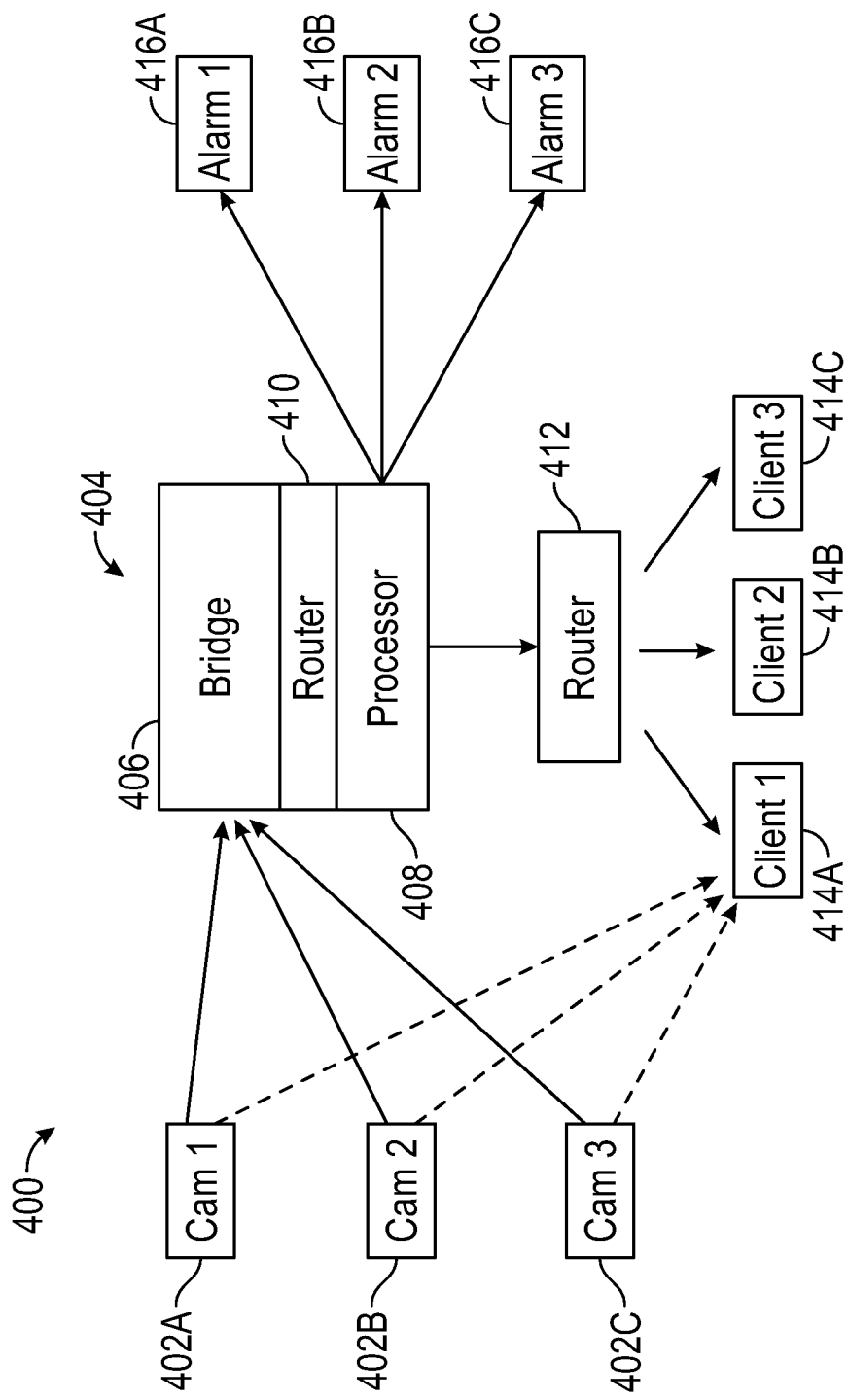
FIG. 4 illustrates an aquatic alert system, in accordance with an embodiment.

FIG. 4 illustrates an aquatic alert system 400, in accordance with an embodiment. In some embodiments, the aquatic alert system 400 includes a camera (e.g., camera 402A, 402B, 402C) and a computing system 404. In some embodiments, the aquatic alert system 400 includes an alarm (e.g., alarm 416A, 416B, 416C). Although the aquatic alert system 400 is described with the illustrated elements, it is understood that the aquatic alert system 400 may include more or less elements or may be combined with elements of other embodiments described in the disclosure. For example, the aquatic alert system 400 may include any number of cameras, computing systems, and alarms, and may be configured to communicate with any number of clients and/or routers. Although the aquatic alert system 400 is described with respect to a swimmer, it is understood that "swimmer" is not limiting. For example, features of the aquatic alert system may be used to detect undesired objects (e.g., animals, someone who accidentally fell into the swimming pool, waste) or an intruder in the swimming pool.

In some embodiments, the camera is camera 102 or camera 202. In some embodiments, the aquatic alert system 400 includes at least one camera (e.g., camera 402A, camera 402B, camera 402C). For example, each camera covers a different area of a swimming pool or covers the swimming pool at different angles.

In some embodiments, the camera is configured to capture frames of a swimming pool (e.g., swimming pool 100). In some embodiments, the aquatic alert system 400 includes more than one camera, and each camera covers a swimming pool from a different angle; each camera is configured to capture frames of the swimming pool from a different angle. In some embodiments, the aquatic alert system 400 includes more than one camera, and each camera covers a different area of a swimming pool; each camera is configured to capture frames of a corresponding portion of the swimming pool.

In some embodiments, the camera includes elements of the aquatic alert system 200 (e.g., processor 204, memory 206, data 208A, program 208B). In some embodiments, the aquatic alert system 400 includes a processor and memory separate from the camera (e.g., the processor is separate from the sensor of the camera; the processor is in a different housing than the camera; the processor and/or the memory are collocated with the camera (e.g., the processor and/or the memory and the camera are both proximate to the swimming pool)). In some embodiments, the processor and memory are in a same housing as the camera. In some embodiments, the computing system 404 is configured to communicate with the processor and the camera. In some embodiments, the processor associated with the camera is located within a range of the swimming pool (e.g., the camera is in visual range (e.g., a visual range of camera provides an image of sufficient detail/clarity that allows associated software to identify an object/swimmer in a pool) of the swimming pool, and the processor is within a communication range of the camera).

In some embodiments, the processor associated with the camera is configured to determine a swimmer is in the swimming pool. In some embodiments, determining whether a swimmer is in the swimming pool includes receiving frames from the video camera, identifying foreground pixels in the frames, and determining whether the identified foreground pixels correspond to the swimmer in the swimming pool. In some embodiments, determining whether a swimmer is in the swimming pool includes detecting, with a sensor, that an object is within the angle range and the distance range, as described in more detail herein.

For example, the camera captures frames of the swimming pool, or the processor associated with the camera receives frames of the swimming pool from the camera. From these frames, the camera or the processor associated with the camera identifies foreground pixels in the frame, and determines whether the foreground pixels correspond to a swimmer in the swimming pool. Examples of foreground pixel and swimmer detection are described with respect to the system in FIG. 1, system 200, and method 300. For the sake of brevity, those examples are not described again here.

In some embodiments, the processor associated with the camera is configured to transmit an instruction to receive captured frames from the video camera and to transmit the captured frames to the computing system in accordance with a determination that the swimmer is in the swimming pool. For example, the processor associated with the camera (e.g., a processor in a housing of the camera, a processor in communication with the camera) determines (e.g., using the methods described herein) that a swimmer is in the swimming pool. In accordance with a determination that the swimmer is in the swimming pool, the processor transmits an instruction (e.g., to a different processor, to itself) to receive the frames from the camera to the processor and to transmit the frames from the processor to the computing system 404 (e.g., for further processing, for event detection).

In some embodiments, transmitting the captured frames to the computing system comprises transmitting the captured frames using a protocol for streaming in real-time. For example, the protocol is at least one of RTSP, HTTP, HTTPS, and SDP.

In some embodiments, in accordance with a determination that the swimmer is in the swimming pool, the processor transmits an instruction (e.g., to a different processor, to itself) to receive the frames from the camera to the processor and to transmit the frames from the processor to the computing system 404 (e.g., for further processing, for event detection) at a first rate. In such embodiments, in accordance with a determination that no swimmer is in the swimming pool, the process forgoes transmit the instruction (causing, e.g., the processor to transmit the frames at a second rate lower than the first, transmit no frames).

In some embodiments, the camera is in wireless communication with other elements of the aquatic alert system 400, and the camera's source of power (e.g., a battery, a rechargeable battery, solar power) may be limited. By transmitting the captured frames (or transmitting the captured frames at a higher rate) to the computing system in accordance with a determination that a swimmer is in the swimming pool (e.g., streaming when someone is in the swimming pool, not streaming when no one is in the swimming pool), camera power consumption (e.g., transmission power) may be advantageously reduced because less power may be consumed in scenarios when an object in the swimming pool is less likely, allowing the source of power to be a feasible primary source of power. For example, using the methods and system described herein, the battery may power the camera for up to days to weeks a single charge, compared to hours to days for a camera that transmits the captured frames whether a swimmer is in the pool or not or a camera that performs on-board drowning detection (which may be more compute-intensive and power consuming). Furthermore, having a more compact power source allows the camera to be installed without connecting to an alternative source of power, simplifying camera installation (e.g., less components (e.g., wires) are needed to install the camera), allowing more camera installation location options, reducing cost, and reducing maintenance. In some embodiments, a charge on a battery of the camera is low (e.g., less than a threshold charge (e.g., 10%, 20%)), an alert is generated (e.g., by the camera, by the processor associated with the camera, by the computing system) to notify a user about the low battery charge.

In some embodiments, the processor associated with the camera is configured to forgo transmitting the instruction in accordance with a determination that the swimmer is not in the swimming pool. For example, in accordance with a determination that no swimmer is in the swimmer pool, the camera does not transmit captured frames to the computing system 404.

In some embodiments, the processor associated with the camera receives frames from the camera. The camera or the processor identifies an area of one of the frames that includes a threshold amount of pixels associated with the swimming pool and identifies a contour bordering the area in the one of the frames. For example, the contour corresponds to a perimeter of the swimming pool. In accordance with a determination that the entire contour is within the frames, the aquatic alert system 400 identifies the swimming pool from the frames. In some embodiments, the pixels associated with the swimming pool are at least one of blue pixels and light green pixels (e.g., colors associated with water).

For example, during installation of the aquatic alert system 400, the camera is configured to automatically identify a swimming pool. The camera captures frames in its view and identifies an area that includes more than a threshold of swimming pool pixels and identifies a contour bordering the area including more than a threshold amount of swimming pool pixels (e.g., image processing determines the area of the frame includes water pixels, the swimming pool is sufficiently in view). If the entire contour is within the field of view of the camera (e.g., entire contour of the swimming pool is within a frame), then the swimming pool is automatically identified and the camera has been properly installed.

In some instances, the camera may not be properly installed. In accordance with a determination that the entire contour is not within the frames or no area includes more than a threshold of swimming pool pixels, a request to reposition the video camera is generated (e.g., to a client device, a warning on the camera, a warning on a GUI of the computing system 404). For example, the field of view of the camera does not align with the swimming pool, and the camera is not properly installed. As another example, the camera may be too far from the swimming pool, and the camera is not properly installed. When the camera is not determined to be properly installed, a request to reposition the camera (e.g., to properly install the camera) is generated. By using the camera to determine whether the swimming pool is within a frame, the camera may be advantageously used to assist installation of the aquatic alert system, and the positioning of the camera may be more suitable for event detection. For example, compared to installation without camera assistance, the lighting and/or resolution of the captured frames may improve. Such improvements can be applied to other embodiments, with or without the system of FIG. 4. For example, identification of a swimming pool (e.g., for camera installation) by the camera may be applied to the embodiments of aquatic alert system in FIG. 1, aquatic alert system 200, and aquatic alert system 500.

In some examples, more than one camera (e.g., camera 402A, 402B, 402C) is included in the aquatic alert system 400, and each camera is configured to capture frames from a portion of the swimming pool. In these examples, the entire contour of the swimming pool may not need to be in the frame of the cameras; the camera is properly installed when it is determined that the entirety of the swimming pool has been covered by the cameras.

In some instances, some conditions may cause the accuracy of swimmer and/or event detection to reduce. For example, a view of the swimming pool is obstructed. As another example, bad weather condition causes the swimming pool and/or swimmer pixels to be less identifiable. In some embodiment, the camera or the processor determines that a swimming pool area of a frame includes less than a threshold amount of pixels associated with the swimming pool. In accordance with a determination that the swimming pool area of the frame includes less than the threshold mount of pixels associated with the swimming pool, the aquatic alert system (e.g., the camera, the processor associated with the camera, the computing system 404) generates a notification corresponding to the determination (e.g., an alert notification to a user indicating a view of the swimming pool is obstructed or reduced).

In some embodiments, the camera or the processor associated with the camera is configured to perform aspects of the disclosed aquatic alert system associated with system in FIG. 1, system 200, and method 300. For the sake of brevity, these aspects are not described again.

In some embodiments, the computing system 404 includes elements of the aquatic alert system 200 (e.g., processor 204, memory 206, data 208A, program 208B, user interface 210). In some embodiments, as illustrated, the computing system 404 includes a bridge 406. For example, the bridge 406 is an ONVIF/RTSP bridge configured to receive frames captured from the camera (e.g., after a swimmer is determined to be in the swimming pool).

In some embodiments, the computing system 404 wirelessly communicates with the camera. As an exemplary advantage, the elements and/or methods described herein allows the camera to be installed wirelessly and communicate wirelessly. By allowing the camera to be installed wirelessly and communicating wirelessly, camera installation is simplified, and more camera installation location options are possible. Additionally, with a more simplified system, cost and maintenance are reduced.

In some embodiments, the alarm is alarm device 104A, 104B, 104C, or 216. In some embodiments, the alarm is configured to generate an alert associated with an event associated with the swimmer. In some embodiments, the alarm generates an alert in response to receiving an event detection signal. In accordance with a determination of the occurrence of the event (e.g., by the computing system 404, by the processor 408), the computing system 404 or the processor 408 transmits the event detection signal to the alarm (e.g., to generate the alert). In some embodiments, the alert includes an alert on a client device (e.g., client 414A, 414B, 414C) indicating the event detection (e.g., an alert that someone is drowning, an intruder alert, an undesired object alert). For example, an alert is broadcasted using a smart speaker.

In some embodiments, the aquatic alert system 400 includes a processor 408. In some embodiments, the processor 408 is an AI processor. In some embodiments, the processor 408 is included in the computing system 404. In some embodiments, the processor 408 receives the captured frames (e.g., from the camera, in accordance to a determination that a swimmer is in the swimming pool, etc.). The processor 408 determines, based on the received captured frames, occurrence of an event associated with the swimmer. In some embodiments, the processor 408 is configured to perform aspects of the disclosed aquatic alert system associated with system in FIG. 1, system 200, and method 300. For the sake of brevity, these aspects are not described again.

In some embodiments, the processor 408 performs more computation intensive and power-consuming processes such as analysis of the frames captured by the camera and determination of an occurrence of an event (e.g., associated with system in FIG. 1, system 200, and method 300). In some embodiments, the processor associated with the camera does not perform these more computation intensive and power-consuming processes. By performing more computation intensive and power-consuming processes at a different processor and not at the processor associated with the camera, the processor associated with the camera may advantageously be more power efficient.

In some embodiments, the aquatic alert system 400 includes a first router 410 configured to wirelessly communicate with the computing system and the alarm over a first network connection. In some embodiments, the first router 410 is a part of the computing system 404. In some embodiments, the first router 410 wirelessly communicates with the camera and/or computing system 404 and the alarm over the first network connection in accordance with a determination that the system is not connected to a second network.

For example, the first router 410 is a fallback router that is configured for wireless connection over a first network (e.g., an internal network, a network different than a second network). The camera, the computing system 404, and/or the alarm are in wireless communication initially over a second network (e.g., a default network, a WiFi network (e.g., using second router 412), an internet connection (e.g., using second router 412), an external network, a network different than the first network). In some instances, the second network becomes unavailable (e.g., unstable network connection, power outage), and in accordance with a determination that the camera, the computing system 404, and/or the alarm is not connected to the second network (e.g., due to the unavailability), the camera, the computing system 404, and/or the alarm wirelessly communicate over the first network using the first router 410. In some embodiments, an alert is generated to notify a user that the first router is active and/or the second network is not available.

As an exemplary advantage, when a default communication connection (e.g., WiFi, internet) is unavailable, the first router allows the aquatic alert system to continue to detect for an event in the swimming pool. Allowing the aquatic alert system to continue to detect for an event during an unavailability may improve safety for a swimmer or a user of the aquatic alert system. For example, without the first router, if a swimmer is experiencing difficulty (e.g., drowning, injured) during connection unavailability, no alert may be generated to indicate that the swimmer requires assistance. As another example, without the first router, if an intruder enters the swimming pool during connection unavailability, no alert may be generated to warn a user about the intruder.

In some embodiments, the aquatic alert system 400 includes a second router 412 configured to wirelessly communicate with the computing system 404 and the alarm over a second network connection. For example, the second router 412 is a WiFi router, and the WiFi router is connected to the alarm over a WiFi or an internet connection.

In some embodiments, the aquatic alert system 400 is connected to a client (e.g., client 414A, 414B, 414C). In some embodiments, the client is a client device. For example, the client is at least one of a user of the aquatic alert system, a lifeguard, a safety personnel, a guardian of a swimmer, a facilities manager, and a homeowner, and the client device is at least one of a phone, a tablet, a laptop, an IoT device (e.g., a smart speaker), a smart home terminal, a security monitor, and a display.

In some embodiments, the client transmits a request for frames from the camera. In some embodiments, the camera, the processor associated with the camera, or the computing system 404 receives the request for frames from the video camera from the client device, and in response to receiving the request for the frames, the camera, the processor associated with the camera, or the computing system 404 transmits the frames to the device.

For example, a user of the aquatic alert system requests a live stream of the swimming pool. Using the user's device, a request for the live stream is transmitted. The camera, the processor associated with the camera, or the computing system 404 receives the request for the live stream, and in response to receiving the request, the camera, the processor associated with the camera, or the computing system 404 transmits the requested live stream to the user's device (e.g., for display).

In some embodiments, the aquatic alert system 400 includes a sensor (not shown) configured to detect an angle and a distance of an object relative to the sensor. The swimming pool spans an angle range and a distance range relative to the sensor, and determining whether the swimmer in the swimming pool includes detecting that the object (e.g., a swimmer) is within the angle range and the distance range with the sensor. In some embodiments, the sensor is a passive infrared sensor (PIR) sensor comprising a Fresnel lens.

For example, the swimming pool is located between −30 degrees and 30 degrees and between 5 m to 7.2 m relative to the sensor. It is understood that these values are exemplary. If the sensor detects an object within the angle range and the distance range relative to the sensor, then a swimmer is determined to be in the swimming pool (e.g., then frames from the camera is transmitted to the computing system for further processing).

In some embodiments, the camera is in wireless communication with other elements of the aquatic alert system 400, and the camera's source of power (e.g., a battery, a rechargeable battery, solar power) may be limited. By using the sensor and transmitting the captured frames to the computing system in accordance with a determination that a swimmer is in the swimming pool (e.g., streaming when someone is in the swimming pool, not streaming when no one is in the swimming pool), camera power consumption (e.g., transmission power, power used to capture/analyze frames for swimmer detection) may be advantageously reduced because less power may be consumed in scenarios when an object in the swimming pool is less likely, allowing the source of power to be a feasible primary source of power. For example, using the methods and system described herein, the battery may power the camera for up to days to weeks on a single charge, compared to hours to days for a camera that transmits the captured frames whether a swimmer is in the pool or not. Furthermore, having a more compact power source allows the camera to be installed without connecting to an alternative source of power, simplifying camera installation (e.g., less components (e.g., wires) are needed to install the camera), allowing more camera installation location options, reducing cost, and reducing maintenance.

In some embodiments, the angle range and distance range relative to the sensor is determined using the camera to identify the swimming pool. The camera captures frames, and the camera or the processor associated with the camera identifies an area of one of the frames as including a threshold amount of pixels associated with the swimming pool (e.g., using the methods described herein). The angle range and the distance range (e.g., used to detect an object using the sensor) correspond to the identified area, and the area includes the threshold amount of pixels are inside a contour of the swimming pool (e.g., as described herein).

Figure 5A:
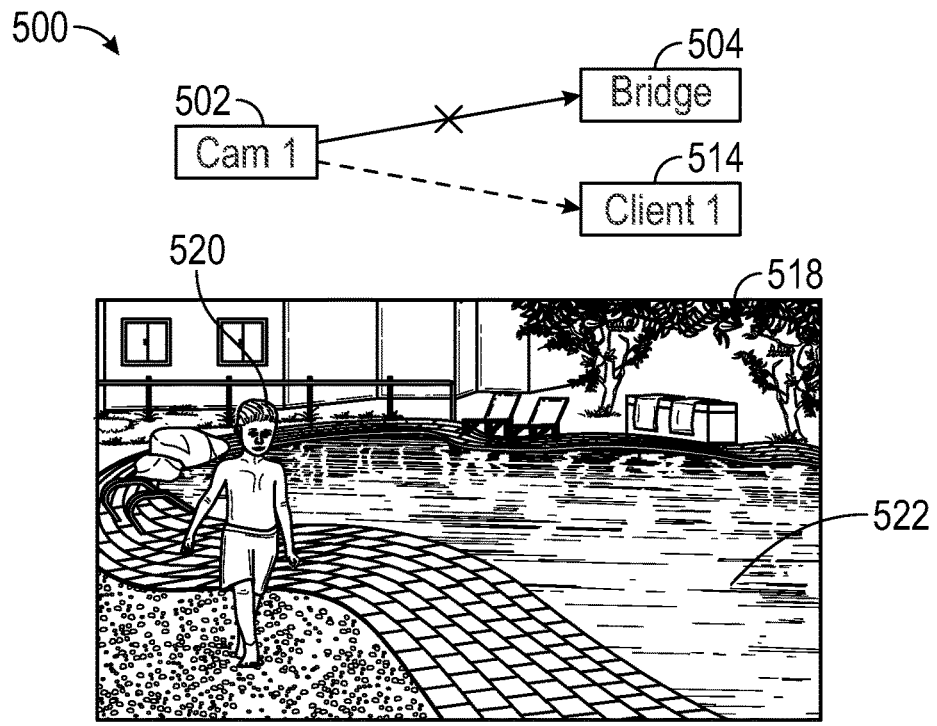
FIGS. 5A-5C illustrate an aquatic alert system, in accordance with an embodiment.
Figure 5B:
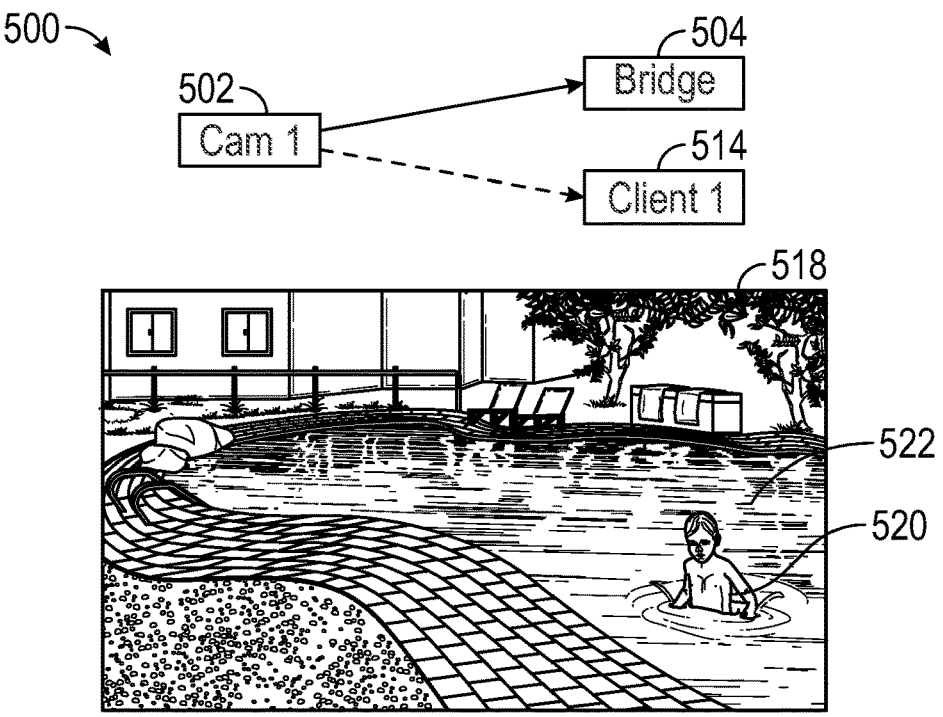
Figure 5C:
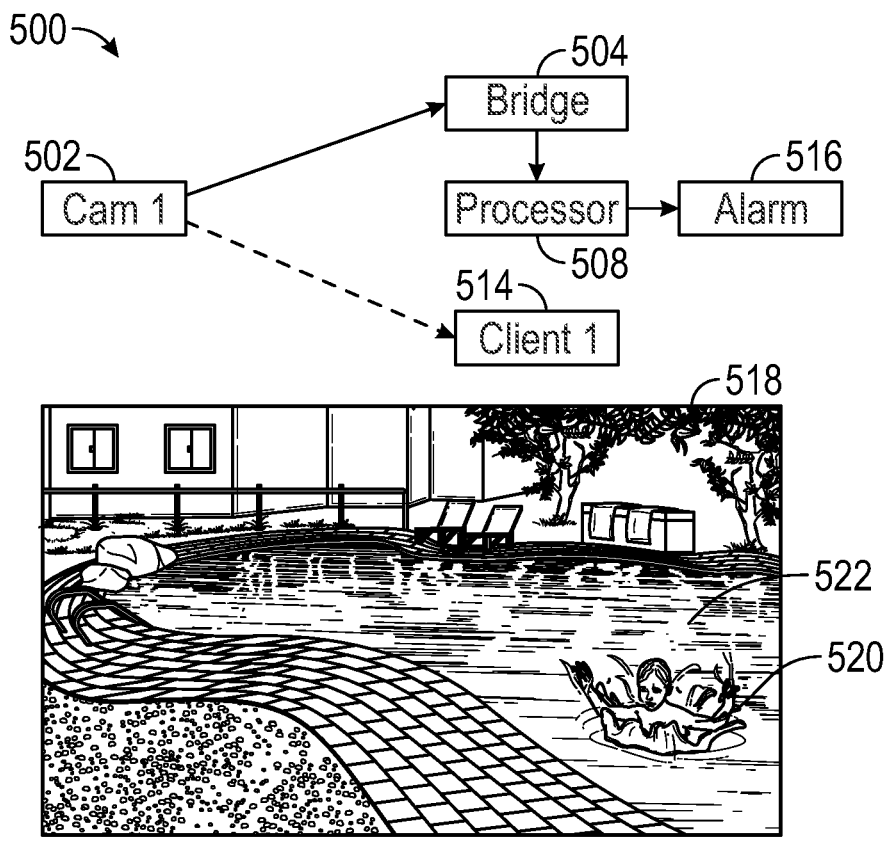

FIGS. 5A-5C illustrate an aquatic alert system 500, in accordance with an embodiment. In some embodiments, the aquatic alert system 500 includes a camera 502, a computing system 504 including a bridge and a processor 508, and an alarm 514. In some embodiments, a processor associated with the camera 502 is located within a housing of the camera. In some embodiments, a processor associated with the camera 502 is located outside a housing of the camera (not shown).

In some embodiments, the aquatic alert system 500 includes elements of at least one of aquatic alert system in FIG. 1, aquatic alert system 200, and aquatic alert system 400. For example, camera 502 is at least one of camera 102, camera 202, 402A, 402B, and 402C, computing system 504 is computing system 404 or includes elements of aquatic system 200, and alarm 514 is at least one of alarm device 104, alarm device 212, alarm 416A, alarm 416B, and alarm 416C. In some embodiments, exemplary advantages of the aquatic alert system 500 are described with respect to FIGS. 1-4. For the sake of brevity, those advantages are not described here.

In some embodiments, the frame 518 illustrates a frame captured by the camera 502. In some embodiments, the frame 518 illustrates a portion of a frame captured by the camera 502. In some embodiments, the frame 518 illustrates a view of the swimming pool from a third person's view (e.g., not the camera view). Although the frame 518 is illustrated as a frame at a moment in time, it is understood that the frame 518 may represent more than one frame over a period of time. In some embodiments, content of the frame 518 may be viewed on a client device 514 in response to a request for the captured frames, as described with respect to FIG. 4.

Although the aquatic alert system 500 is described with respect to a person 520, it is understood that the person and the exemplary actions of the person are not limiting. For example, features of the aquatic alert system may be used to detect undesired objects (e.g., animals, someone who accidentally fell into the swimming pool, waste) or an intruder in the swimming pool.

FIG. 5A illustrates a person 520 away from the swimming pool 522, in accordance with an embodiment. In some embodiments, at this time, the camera 502 or the processor associated with the camera determines that the person 520 is not in the swimming pool 522, transmission of an instruction to receive captured frames (and to transmit the captured frames to the computing system 504) is forgone, as illustrated by a lack of a connection between the camera 502 and the computing system 504.

FIG. 5B illustrates a person 520 in the swimming pool 522, in accordance with an embodiment. For example, the person 520 from FIG. 5A decided to jump into the swimming pool 522 and started swimming. In some embodiments, at this time, the camera 502 or the processor associated with the camera determines that the person 520 (e.g., a swimmer) is in the swimming pool 522, an instruction to receive captured frames (and to transmit the captured frames to the computing system 504) is transmitted, as illustrated by a connection between the camera 502 and the computing system 504.

In some embodiments, to determine that the person 520 is in the swimming pool 522, the camera 502 or the processor associated with the camera 502 receives the frame 518, identifies foreground pixels in the frame 518, and determines whether the identified foreground pixels correspond to the swimmer in the swimming pool (e.g., person 520 in the swimming pool 522). Exemplary elements and/or methods for identifying foreground pixels are described with respect to FIGS. 1-4. For the sake of brevity, these elements and/or methods are not described here.

In some embodiments, the connection between the camera 502 and the computing system 504 includes transmission of the captured frames (e.g., from frame 518) using a protocol for streaming in real-time. In some embodiments, the computing system includes an ONVIF/RTSP bridge and is configured to receive the captured frames, as illustrated.

FIG. 5C illustrates a person 520 involved in an event (e.g., drowning, injury) in the swimming pool 522, in accordance with an embodiment. For example, the person 520 from FIG. 5B began to struggle in the swimming pool. In some embodiments, at this time, the processor 508 (e.g., processor 204, processor 408) of the computing system 504 receives the captured frames (e.g., frame 518 from camera 502 over the bridge) and determines occurrence of an event (e.g., prolonged submergence, struggling to stay afloat, drowning, etc.) associated with the swimmer based on the received captured frames.

In some embodiments, in accordance with a determination of the occurrence of the event, an event detection signal is transmitted to the alarm 516, and in response to receiving an event detection signal, the alarm 516 generates an alert (e.g., to seek assistance for the drowning person 520). In some embodiments, the alert includes an alert on a client device (e.g., client 514) indicating the event detection (e.g., an alert that someone is drowning, an intruder alert, an undesired object alert). Exemplary elements and/or methods for event detection are described with respect to FIGS. 1-4. For the sake of brevity, these elements and/or methods are not described here.

Figure 6:
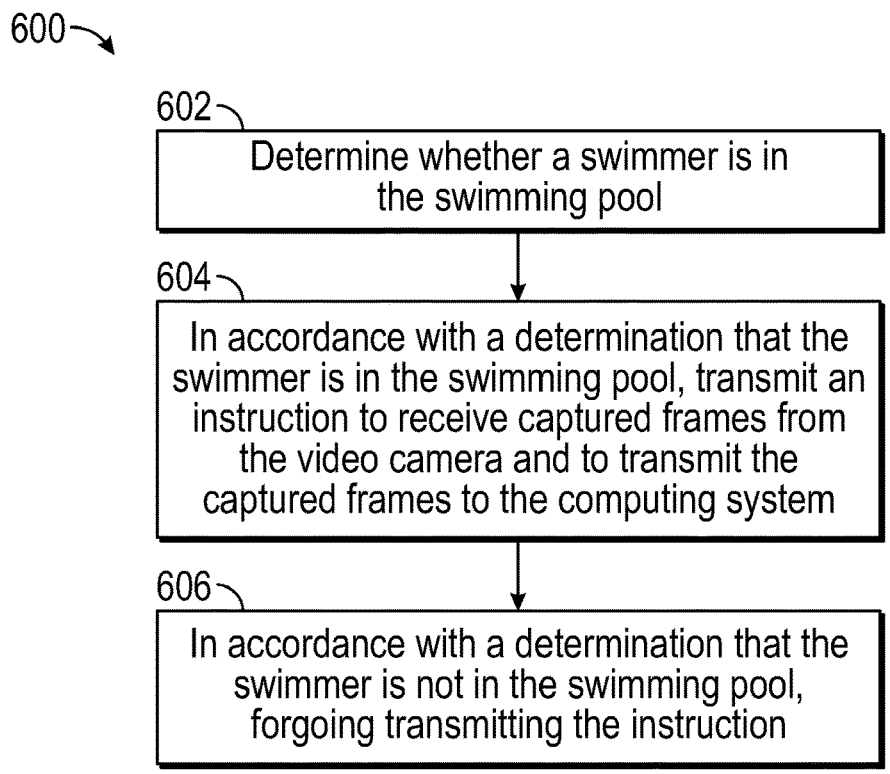
FIG. 6 illustrates a method of operating an aquatic alert system, in accordance with an embodiment.

FIG. 6 illustrates a method 600 of operating an aquatic alert system, in accordance with an embodiment. Although the method 600 is illustrated as including the described steps, it is understood that different order of step, additional step (e.g., combination with other methods disclosed herein), or less step may be included without departing from the scope of the disclosure. In some embodiments, the method 600 is performed with at least one of aquatic alert system in FIG. 1, aquatic alert system 200, aquatic alert system 400, and aquatic alert system 500. For the sake of brevity, some elements and advantages associated with these aquatic alert systems are not repeated here.

In some embodiments, the method 600 includes determining whether a swimmer is in the swimming pool (step 602). For example, as described with respect to FIGS. 5A and 5B, the aquatic alert system 500 determines whether the person 520 is in the swimming pool.

In some embodiments, determining whether a swimmer is in the swimming pool includes receiving frames from the video camera, identifying foreground pixels in the frames, and determining whether the identified foreground pixels correspond to the swimmer in the swimming pool. For example, as described with respect to FIGS. 5A and 5B, to determine whether that the person 520 is in the swimming pool 522, the camera 502 or the processor associated with the camera 502 receives the frame 518, identifies foreground pixels in the frame 518, and determines whether the identified foreground pixels correspond to the swimmer in the swimming pool (e.g., person 520 in the swimming pool 522).

In some embodiments, the method 600 includes in accordance with a determination that the swimmer is in the swimming pool, transmitting an instruction to receive captured frames from the video camera and to transmit the captured frames to the computing system (step 604). For example, as described with respect to FIG. 5B, the aquatic alert system 500 determines that the person 520 is in the swimming pool, and an instruction to receive captured frames from the video camera and to transmit the captured frames to the computing system is transmitted.

In some embodiments, the method 600 includes in accordance with a determination that the swimmer is in the swimming pool, the processor transmits an instruction (e.g., to a different processor, to itself) to receive the frames from the camera to the processor and to transmit the frames from the processor to the computing system 404 (e.g., for further processing, for event detection) at a first rate.

In some embodiments, transmitting the captured frames to the computing system includes transmitting the captured frames using a protocol for streaming in real-time. For example, as described with respect to FIG. 5B, the frames 518 are transmitted to the computing system 504 using a protocol for streaming in real-time.

In some embodiments, the method 600 includes in accordance with a determination that the swimmer is not in the swimming pool, forgoing transmitting the instruction (step 606). For example, as described with respect to FIG. 5A, the aquatic alert system 500 determines that the person 520 is not in the swimming pool, and an instruction to receive captured frames from the video camera and to transmit the captured frames to the computing system is not transmitted In some embodiments, the method 600 includes in accordance with a determination that the swimmer is in the swimming pool, the processor transmits an instruction (e.g., to a different processor, to itself) to receive the frames from the camera to the processor and to transmit the frames from the processor to the computing system 404 (e.g., for further processing, for event detection) at a second rate, lower than the first rate.

In some embodiments, the method 600 includes generating an alert associated with an event associated with the swimmer and wirelessly communicating, with a router, with the computing system and the alarm over a first network connection. In some embodiments, the router wirelessly communicates with the computing system and the alarm over the first network connection in accordance with a determination that the system is not connected to a second network. For example, as described with respect to FIG. 4, the first router 410 is a fallback router that is configured for wireless connection over a first network (e.g., an internal network, a network different than a second network). The camera (e.g., camera 402A, 402B, 402C), the computing system 404, and/or the alarm (e.g., alarm 416A, 416B, 416C) are in wireless communication initially over a second network (e.g., a default network, a WiFi network (e.g., using second router 412), an internet connection (e.g., using second router 412), an external network, a network different than the first network). In some instances, the second network becomes unavailable (e.g., unstable network connection, power outage), and in accordance with a determination that the camera, the computing system 404, and/or the alarm is not connected to the second network (e.g., due to the unavailability), the camera, the computing system 404, and/or the alarm wirelessly communicate over the first network using the first router 410.

In some embodiments, the method 600 includes receiving, from a device, a request for frames from the video camera; and in response to receiving the request for the frames, transmitting a second instruction to receive the frames from the video camera and to transmit the frames to the device. For example, a client device (e.g., client 414A, client 414B, client 414C, client 514) requests for a stream of the swimming pool, and in response to the request, a stream is provided to the client device.

In some embodiments, the method 600 includes receiving frames from the video camera, identifying an area of one of the frames comprising a threshold amount of pixels associated with the swimming pool, identifying a contour bordering the area in the one of the frames, the contour corresponding to a perimeter of the swimming pool, and in accordance with a determination that the entire contour is within the frames, identifying the swimming pool from the frames. In some embodiments, the method 600 includes in accordance with a determination that the entire contour is not within the frames, generating a request to reposition the video camera. For example, as described with respect to FIG. 4, the camera (e.g., camera 402A, 402B, 402C) is used to determine whether a swimming pool is within a frame of the camera (e.g., during installation), and a warning to reposition the camera is generated when the swimming pool is not entirely within the frame of the camera.

In some embodiments, the method 600 includes in accordance with a determination that the swimming pool area of the frame includes less than the threshold mount of pixels associated with the swimming pool, generating a notification corresponding to the determination. For example, an alert notification is generated for a user indicating a view of the swimming pool is obstructed or reduced). In some embodiments, the method 600 includes in accordance with a determination that the swimming pool area of the frame includes at least the threshold mount of pixels associated with the swimming pool, forgoing generating the notification corresponding to the determination.

In some embodiments, the swimming pool spans an angle range and a distance range relative to a sensor configured to detect an angle and a distance of an object relative to the sensor, and determining whether the swimmer in the swimming pool includes detecting, with the sensor, that the object is within the angle range and the distance range. For example, as described with respect to FIG. 4, a PIR sensor is used to determine whether a swimmer is in the swimming pool. In some embodiments, the swimming pool's angle range and distance range relative to the sensor is determine as described with respect to FIG. 4.

In some embodiments, the method 600 includes receiving the captured frames and determining, based on the received captured frames, occurrence of an event associated with the swimmer. For example, as described with respect to FIG. 5C, the processor 508 (e.g., processor 204, processor 408) of the computing system 504 receives the captured frames (e.g., frame 518 from camera 502 over the bridge) and determines occurrence of an event (e.g., drowning) associated with the swimmer based on the received captured frames.

In some embodiments, the method 600 includes in accordance with a determination of the occurrence of the event, transmitting the event detection signal to the alarm, and in response to receiving an event detection signal, the alarm 516 generates an alert (e.g., to seek assistance for the drowning person 520). In some embodiments, the method 600 includes in accordance with a determination of the event is not occurring, forgoing transmitting the event detection signal to the alarm. In some embodiments, the alert includes an alert on a client device (e.g., client 514) indicating the event detection (e.g., an alert that someone is drowning, an intruder alert, an undesired object alert). Exemplary elements and/or methods for event detection are described with respect to FIGS. 1-4. For the sake of brevity, these elements and/or methods are not described here.

Figure 7:
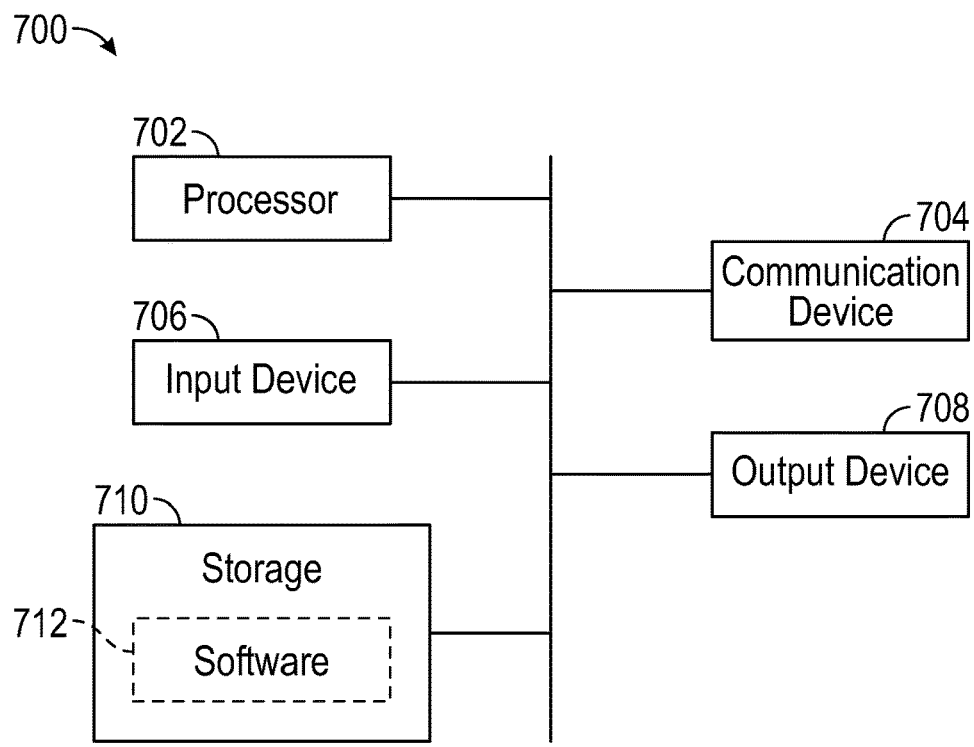
FIG. 7 illustrates a computing device, in accordance with an embodiment.

FIG. 7 illustrates an example of a computing device 700, in accordance with an embodiment. In some embodiments, the device 700 is configured to be coupled to the disclosed systems and is configured to perform the operational methods associated with the systems disclosed herein.

Device 700 can be a host computer connected to a network. Device 700 can be a client computer (e.g., a disclosed computing system), a server (e.g., a disclosed computing system), a portable device (e.g., alarm device 214), or a camera system (e.g., camera 102, camera 202, camera 402A, camera 402B, camera 402C, camera 502). As shown in FIG. 7, device 700 can be any suitable type of microprocessor-based device, such as a dedicated computing device, a personal computer, work station, server, handheld computing device (portable electronic device) such as a smartwatch, phone, or tablet. The device can include, for example, one or more of processors 702, communication device 704, input device 706, output device 708, and storage 710. Input device 706 and output device 708 can generally correspond to those described above and can either be connectable or integrated with the computer.

Input device 706 can be any suitable device that provides input, such as a camera sensor, touchscreen, keyboard or keypad, mouse, voice-recognition device, or a user interface (e.g., user interface 210). Output device 708 can be any suitable device that provides output, such as an illuminator, a touchscreen (e.g., display 216), haptics device, or speaker.

Storage 710 can be any suitable device that provides storage, such as an electrical, magnetic, or optical memory including a RAM, cache, hard drive, or removable storage disk. In some examples, the storage 710 includes memory 206. Communication device 704 can include any suitable device capable of transmitting and receiving signals (e.g., streaming data) over a network, such as a network interface chip or device. The components of the computer can be connected in any suitable manner, such as via a physical bus, or wirelessly.

Software 712, which can be stored in storage 710 and executed by processor 702, can include, for example, the programming that embodies the functionality of the present disclosure (e.g., as embodied in the devices described above, a drowning detection program).

Software 712 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 710, that can contain or store programming for use by or in connection with an instruction-execution system, apparatus, or device.

Software 712 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 700 may be connected to a network (e.g., an internal network, an external network), which can be any suitable type of interconnected communication system. The network can implement any suitable communications protocol and can be secured by any suitable security protocol. The network can comprise network links of any suitable arrangement that can implement the transmission and reception of network signals, such as wireless network connections, mobile internet connections, Bluetooth connections, NFC connections, T1 or T3 lines, cable networks, DSL, or telephone lines.

Device 700 can implement any operating system suitable for operating on the network. Software 712 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

In one aspect, a system, comprises: a video camera configured to capture frames of a swimming pool; a computing system configured to communicate with the camera and including a processor and memory; and a program stored in the memory, configured to be executed by the processor, and including instructions for: receiving the frames captured with the video camera; for each frame captured with the video camera, identifying: interior pool pixels associated with an interior region of the swimming pool in the frame, the interior pool region including a water area of the swimming pool, background pixels in the frame, foreground pixels in the frame wherein the foreground pixels correspond to detected foreground objects, and swimming pool information associated with objects in the frame; based on the identified background pixels, foreground pixels, and swimming pool information: forming a block for each swimmer in the foreground pixels, and tagging each swimmer in the frame with a respective identifier; tracking each swimmer by using image tracking and motion prediction algorithms on the formed blocks; determining, based on the swimming pool information and the image tracking and motion prediction algorithms whether a criterion is met for a tracked swimmer; and in accordance with a determination that the criterion is met for the tracked swimmer, generating a detection signal indicating an event associated with the tracked swimmer.

In some aspects of the above system, the instructions further comprise: determining a number of swimmers based on the interior pool and foreground pixels and the swimming pool information; detecting a swimmer leaving or entering the interior pool region; updating the number of swimmers based on the swimmer detection; determining that the swimmer entered the interior pool region after a predetermined amount of time; and in accordance with the determination that the swimmer entered the interior pool region after the predetermined amount of time, tagging the swimmer with an identifier; and in response to detecting the swimmer leaving the interior pool region, untagging the swimmer.

In some aspects of the above systems, the instructions further comprise determining a number of swimmers based on the interior pool and foreground pixels and the swimming pool information, and the criterion is met when a number of detected foreground objects is less than the number of swimmers.

In some aspects of the above systems, the instructions further comprise determining a number of swimmers based on the interior pool and foreground pixels and the swimming pool information, and the number of swimmers is a number of detected foreground objects.

In some aspects of the above systems, the criterion includes at least one of swimmer speed, swimmer posture, a splash threshold, an activity threshold, a submergence threshold, a submergence variance, and swimmer vertical movement.

In some aspects of the above systems, the criterion dynamically updates based on a depth corresponding to the swimmer's position in the swimming pool.

In some aspects of the above systems, the criterion dynamically updates based a distance of the swimmer from the camera.

In some aspects of the above systems, the criterion dynamically updates based on a surrounding brightness of a camera view.

In some aspects of the above systems, determining whether the criterion is met further comprises determining a probability of the event based on a criterion emphasis factor associated with the tracked swimmer, and the instructions further comprise: learning behaviors of the tracked swimmers; and updating the criterion emphasis factors of the tracked swimmers based on the learned behaviors.

In some aspects of the above systems, the instructions further comprise generating an alert associated with the event in response to the generated detection signal.

In some aspects of the above systems, the system further comprises a wearable device, wherein the instructions further comprise transmitting the generated alert to the wearable device.

In some aspects of the above systems, the computing system comprises a user interface, and the instructions further comprise: selecting, on the user interface, an activity in the swimming pool; and updating the criterion based on the selected activity.

In some aspects of the above systems, the computing system comprises a user interface, and determining whether the criterion is met further comprises determining a probability of the event based on a criterion emphasis factor associated with the tracked swimmer, and the instructions further comprise: selecting, on the user interface, a behavior of a tracked swimmer; and adjusting the criterion emphasis factors of the tracked swimmer based on the selected behavior.

In some aspects of the above systems, the instructions further comprise: tracking a history of the swimming pool; learning site attributes of the swimming pool based on the history; and updating the criterion based on the learned site attributes.

In some aspects of the above systems, determining whether the criterion is met further comprises determining a probability of the event based on a criterion emphasis factor associated with the tracked swimmer, and the instructions further comprise: determining whether the swimming pool is a first type of swimming pool or a second type of swimming pool; in accordance with a determination that the swimming pool is the first type, setting the criterion emphasis factors of the tracked swimmers based on a first preset; and in accordance with a determination the swimming pool is the second type, setting the criterion emphasis factors of the tracked swimmers based on a second preset.

In some aspects of the above systems, the receiving of the frames with the video camera and the identifying of the interior pool pixels, the background pixels, the foreground pixels, and the swimming pool information are performed concurrently.

In some aspects of the above systems, identifying the interior pool pixels, the background pixels and the foreground pixels further comprises identifying at least one of shape, size, color, and geometry of objects in the interior pool pixels, the background pixels and the foreground pixels.

In some aspects of the above systems, the system further comprises solar panels configured to charge the camera.

In some aspects of the above systems, the instructions further comprise storing the captured frames in the computing system.

In some aspects of the above systems, the computing system and the camera are configured to communicate wirelessly.

In some aspects of the above systems, the receiving of the frames with the video camera includes using one of RTSP, HTTP, HTTPS, and SDP.

In some aspects of the above systems, the computing system is one of AI processor, cloud computing platform, a processor with AI and video/graphics booster technology having sufficient computation power and processing speed, a fast computing platform, and a parallel computing platform.

In some aspects of the above systems, the forming of the block for each swimmer comprises determining whether the block includes at least a threshold amount of foreground pixels.

In some aspects of the above systems, the instructions further comprises: identifying a difference between the identified background pixels at a first time and the identified background pixels at a second time, and dynamically updating the criterion based on the difference.

In some aspects of the above systems, the image tracking and motion prediction algorithms include at least one of Lucas-Kanade algorithm, Optical Flow Method, particle tracking, and Black-Jepson method.

In some aspects of the above systems, a first block associated with a first swimmer and a second block associated with a second swimmer at least partially overlap and form a third block, and the forming of the cluster of each swimmer further comprises using: a hierarchical k-means clustering algorithm to separate the first and second clusters, a Markov Random Field (MRF) to form the first and second clusters based on the identified background pixels, foreground pixels, and swimming pool information, and a linear prediction scheme to determine centroids of each swimmer by predicting direction and location of the swimmer.

In some aspects of the above systems, the instructions further comprise updating the criterion based on a user input.

In some aspects of the above systems, the instructions further comprise updating the criterion based on at least one of a Monte-Carlo simulation, user data, neural network data, and random forests.

In some aspects of the above systems, determining whether the criterion is met further comprises determining a probability of the event based on a criterion emphasis factor associated with the tracked swimmer, and the instructions further comprise updating the criterion emphasis factors of the tracked swimmer based on at least one of a Monte-Carlo simulation and user data.

In some aspects of the above systems, the determination of whether a criterion is met for the tracked swimmer is further based on a probabilistic model.

In some aspects of the above systems, determining whether the criterion is met further comprises determining a probability of the event based on a criterion emphasis factor associated with the tracked swimmer, and the instructions further comprise determining whether the tracked swimmer is moving relative to a center of the tracked swimmer; in accordance with a determination that the tracked swimmer is moving relative to the center of the tracked swimmer, updating the criterion emphasis factors of the tracked swimmers; and in accordance with a determination that the tracked swimmer is not moving relative to the center of the tracked swimmer, forgoing updating the criterion emphasis factors of the tracked swimmers.

In some aspects of the above systems, the instructions further comprise determining the tracked swimmer is an animal based on at least a size, geometry, and movement of the animal, and in accordance with a determination that the tracked swimmer is the animal, the criterion is met.

In one aspect, a method comprises: capturing, with a video camera, frames of a swimming pool; receiving the frames captured with the video camera; for each frame captured with the video camera, identifying: interior pool pixels associated with an interior region of the swimming pool in the frame, the interior pool region including a water area of the swimming pool, background pixels in the frame, foreground pixels in the frame, wherein the foreground pixels correspond to detected foreground objects, and swimming pool information associated with objects in the frame; based on the identified background pixels, foreground pixels, and swimming pool information: forming a block for each swimmer in the foreground pixels, and tagging each swimmer in the frame with a respective identifier; tracking each swimmer by using image tracking and motion prediction algorithms on the formed blocks; determining, based on the swimming pool information and the image tracking and motion prediction algorithms whether a criterion is met for a tracked swimmer; and in accordance with a determination that the criterion is met for the tracked swimmer, generating a detection signal indicating an event associated with the tracked swimmer.

In some aspects of the above method, the method further comprises determining a number of swimmers based on the interior pool and foreground pixels and the swimming pool information; detecting a swimmer leaving or entering the interior pool region; updating the number of swimmers based on the swimmer detection; determining that the swimmer entered the interior pool region after a predetermined amount of time; and in accordance with the determination that the swimmer entered the interior pool region after the predetermined amount of time, tagging the swimmer with an identifier; and in response to detecting the swimmer leaving the interior pool region, untagging the swimmer.

In some aspects of the above methods, the method further comprises determining a number of swimmers based on the interior pool and foreground pixels and the swimming pool information, wherein the criterion is met when a number of detected foreground objects is less than the number of swimmers.

In some aspects of the above methods, the method further comprises determining a number of swimmers based on the interior pool and foreground pixels and the swimming pool information, wherein the number of swimmers is a number of detected foreground objects.

In some aspects of the above methods, the criterion includes at least one of swimmer speed, swimmer posture, a splash threshold, an activity threshold, a submergence threshold, a submergence variance, and swimmer vertical movement.

In some aspects of the above methods, the method further comprises dynamically updating the criterion based on a depth corresponding to the swimmer's position in the swimming pool.

In some aspects of the above methods, the method further comprises dynamically updating the criterion based a distance of the swimmer from the camera.

In some aspects of the above methods, the method further comprises dynamically updating the criterion based on a surrounding brightness of a camera view.

In some aspects of the above methods, determining whether the criterion is met further comprises determining a probability of the event based on a criterion emphasis factor associated with the tracked swimmer, and the method further comprises: learning behaviors of the tracked swimmers; and updating the criterion emphasis factors of the tracked swimmers based on the learned behaviors.

In some aspects of the above methods, the method further comprises generating an alert associated with the event in response to the generated detection signal.

In some aspects of the above methods, the method further comprises transmitting the generated alert to a wearable device.

In some aspects of the above methods, the computing system comprises a user interface, and the method further comprises: selecting, on the user interface, an activity in the swimming pool; and updating the criterion based on the selected activity.

In some aspects of the above methods, the method further comprises determining whether the criterion is met further comprises determining a probability of the event based on a criterion emphasis factor associated with the tracked swimmer; selecting, on a user interface, a behavior of a tracked swimmer; and adjusting the criterion emphasis factors of the tracked swimmer based on the selected behavior.

In some aspects of the above methods, the method further comprises tracking a history of the swimming pool; learning site attributes of the swimming pool based on the history; and updating the criterion based on the learned site attributes.

In some aspects of the above methods, determining whether the criterion is met further comprises determining a probability of the event based on a criterion emphasis factor associated with the tracked swimmer, and the method further comprises: determining whether the swimming pool is a first type of swimming pool or a second type of swimming pool; in accordance with a determination that the swimming pool is the first type, setting the criterion emphasis factors of the tracked swimmers based on a first preset; and in accordance with a determination the swimming pool is the second type, setting the criterion emphasis factors of the tracked swimmers based on a second preset.

In some aspects of the above methods, the receiving of the frames with the video camera and the identifying of the interior pool pixels, the background pixels, the foreground pixels, and the swimming pool information are performed concurrently.

In some aspects of the above methods, identifying the interior pool pixels, the background pixels and the foreground pixels further comprises identifying at least one of shape, size, color, and geometry of objects in the interior pool pixels, the background pixels and the foreground pixels.

In some aspects of the above methods, the method further comprises using solar panels to charge the camera.

In some aspects of the above methods, the method further comprises storing the captured frames in a computing system.

In some aspects of the above methods, the computing system and the camera are configured to communicate wirelessly.

In some aspects of the above methods, wherein the computing system is one of AI processor, cloud computing platform, a processor with AI and video/graphics booster technology having sufficient computation power and processing speed, a fast computing platform, and a parallel computing platform.

In some aspects of the above methods, the receiving of the frames with the video camera includes using one of RTSP, HTTP, HTTPS, and SDP.

In some aspects of the above methods, the forming of the block for each swimmer comprises determining whether the block includes at least a threshold amount of foreground pixels.

In some aspects of the above methods, the method further comprises identifying a difference between the identified background pixels at a first time and the identified background pixels at a second time, and dynamically updating the criterion based on the difference.

In some aspects of the above methods, the image tracking and motion prediction algorithms include at least one of Lucas-Kanade algorithm, Optical Flow Method, particle tracking, and Black-Jepson method.

In some aspects of the above methods, a first block associated with a first swimmer and a second block associated with a second swimmer at least partially overlap and form a third block, and the forming of the cluster of each swimmer further comprises using: a hierarchical k-means clustering algorithm to separate the first and second clusters, a Markov Random Field (MRF) to form the first and second clusters based on the identified background pixels, foreground pixels, and swimming pool information, and a linear prediction scheme to determine centroids of each swimmer by predicting direction and location of the swimmer.

In some aspects of the above methods, the method further comprises updating the criterion based on a user input.

In some aspects of the above methods, the method further comprises updating the criterion based on at least one of a Monte-Carlo simulation, user data, neural network data, and random forest data.

In some aspects of the above methods, determining whether the criterion is met further comprises determining a probability of the event based on a criterion emphasis factor associated with the tracked swimmer, and the method further comprises updating the criterion emphasis factors of the tracked swimmer based on at least one of a Monte-Carlo simulation and user data.

In some aspects of the above methods, wherein the determination of whether a criterion is met for the tracked swimmer is further based on a probabilistic model.

In some aspects of the above methods, determining whether the criterion is met further comprises determining a probability of the event based on a criterion emphasis factor associated with the tracked swimmer, and the method further comprises: determining whether the tracked swimmer is moving relative to a center of the tracked swimmer; in accordance with a determination that the tracked swimmer is moving relative to the center of the tracked swimmer, updating the criterion emphasis factors of the tracked swimmers; and in accordance with a determination that the tracked swimmer is not moving relative to the center of the tracked swimmer, forgoing updating the criterion emphasis factors of the tracked swimmers.

In some aspects of the above methods, the method further comprises determining the tracked swimmer is an animal based on at least a size, geometry, and of the animal, and wherein in accordance with a determination that the tracked swimmer is the animal, the criterion is met.

In one aspect, a non-transitory computer readable storage medium stores one or more programs, the one or more programs comprising instructions, which when executed by an electronic device with one or more processors and memory, cause the device to perform any of the above methods.

In one aspect, a system includes: a video camera configured to capture frames of a swimming pool; a processor and a memory collocated with the video camera; a computing system configured to remotely communicate with the processor and memory; and a program stored in the memory, configured to be executed by the processor, and including instructions for: determining whether a swimmer is in the swimming pool; in accordance with a determination that the swimmer is in the swimming pool, transmitting an instruction to receive captured frames from the video camera and to transmit the captured frames to the computing system; and in accordance with a determination that the swimmer is not in the swimming pool, forgoing transmitting the instruction.

In some aspects of the above system, transmitting the captured frames to the computing system includes transmitting the captured frames using a protocol for streaming in real-time.

In some aspects of the above systems, determining whether a swimmer is in the swimming pool includes: receiving frames from the video camera; identifying foreground pixels in the frames; and determining whether the identified foreground pixels correspond to the swimmer in the swimming pool.

In some aspects of the above systems, the computing system includes an ONVIF/RTSP bridge configured to receive the captured frames.

In some aspects of the above systems, the computing system is configured to wirelessly communicate with the video camera.

In some aspects of the above systems, the system further includes: an alarm configured to generate an alert associated with an event associated with the swimmer; and a router configured to wirelessly communicate with the computing system and the alarm over a first network connection.

In some aspects of the above systems, the router is configured to wirelessly communicate with the computing system and the alarm over the first network connection in accordance with a determination that the system is not connected to a second network.

In some aspects of the above systems, the program further includes instructions for: receiving, from a device, a request for frames from the video camera; and in response to receiving the request for the frames, transmitting a second instruction to receive the frames from the video camera and to transmit the frames to the device.

In some aspects of the above systems, the program further includes instructions for: receiving frames from the video camera; identifying an area of one of the frames including a threshold amount of pixels associated with the swimming pool; identifying a contour bordering the area in the one of the frames; and in accordance with a determination that the entire contour is within the frames, identifying the swimming pool from the frames.

In some aspects of the above systems, the pixels associated with the swimming pool are at least one of blue pixels and light green pixels.

In some aspects of the above systems, the program further includes instructions for in accordance with a determination that the entire contour is not within the frames, generating a request to reposition the video camera.

In some aspects of the above systems, the program further includes instructions for: in accordance with a determination that the swimming pool area of the frame includes less than the threshold mount of pixels associated with the swimming pool, generating a notification corresponding to the determination; and in accordance with a determination that the swimming pool area of the frame includes at least the threshold mount of pixels associated with the swimming pool, forgoing generating the notification corresponding to the determination.

In some aspects of the above systems, the system further includes a sensor configured to detect an angle and a distance of an object relative to the sensor. The swimming pool spans an angle range and a distance range relative to the sensor, and determining whether the swimmer in the swimming pool includes detecting, with the sensor, that the object is within the angle range and the distance range.

In some aspects of the above systems, the sensor is a passive infrared sensor (PIR) sensor includes a Fresnel lens.

In some aspects of the above systems, the program further includes instructions for: capturing the frames with the video camera; and identifying an area of one of the frames including a threshold amount of pixels associated with the swimming pool, wherein the angle range and the distance range correspond to the identified area.

In some aspects of the above systems, the area including the threshold amount of pixels are inside a contour of the swimming pool.

In some aspects of the above systems, the computing system includes a second processor and a second memory, and a second program is stored in the second memory, configured to be executed by the second processor, and including instructions for: receiving the captured frames; and determining, based on the received captured frames, occurrence of an event associated with the swimmer.

In some aspects of the above systems, the system further includes an alarm configured to generate an alert in response to receiving an event detection signal, wherein the second program includes instructions further for in accordance with a determination of the occurrence of the event, transmitting the event detection signal to the alarm.

In some aspects of the above systems, the video camera includes the processor and the memory.

In one aspect, a method includes steps the above systems are configured to perform.

In one aspect, a non-transitory computer readable storage medium storing one or more programs, the one or more programs including instructions, which when executed by an electronic device with one or more processors and memory, cause the device to perform the above method.

Generally, as used herein, the term "substantially" is used to describe element(s) or quantit(ies) ideally having an exact quality (e.g., fixed, the same, uniformed, equal, similar, proportional), but practically having qualities functionally equivalent to the exact quality. For example, an element or quantity is described as being substantially fixed or uniformed can deviate from the fixed or uniformed value, as long as the deviation is within a tolerance of the system (e.g., accuracy requirements, etc.). As another example, two elements or quantities described as being substantially equal can be approximately equal, as long as the difference is within a tolerance that does not functionally affect a system's operation.

Likewise, although some elements or quantities are described in an absolute sense without the term "substantially", it is understood that these elements and quantities can have qualities that are functionally equivalent to the absolute descriptions. For example, in some embodiments, a ratio is described as being one. However, it is understood that the ratio can be greater or less than one, as long as the ratio is within a tolerance of the system (e.g., accuracy requirements, etc.).

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A system, comprising:
 a video camera configured to capture frames of a swimming pool;
 a computing system configured to communicate with the camera and including a processor and memory; and
 a program stored in the memory, configured to be executed by the processor, and including instructions for:
  receiving the frames captured with the video camera;
  for each frame captured with the video camera, identifying:
   interior pool pixels associated with an interior region of the swimming pool in the frame, the interior pool region including a water area of the swimming pool, background pixels in the frame,
foreground pixels in the frame, wherein the foreground pixels correspond to detected foreground objects, and
swimming pool information associated with objects in the frame;
based on the identified background pixels, foreground pixels, and swimming pool information:
forming a block for each swimmer in the foreground pixels, and
tagging each swimmer in the frame with a respective identifier;
tracking each swimmer by using image recognition and motion prediction algorithms on the formed blocks;
determining, based on the swimming pool information and the image recognition and motion prediction algorithms, whether a first dynamic criterion is met for a first tracked swimmer;
in accordance with a determination that the first dynamic criterion is met for the first tracked swimmer, generating a first detection signal indicating a first event associated with the first tracked swimmer, wherein the first event comprises the first tracked swimmer drowning;
determining, based on the swimming pool information, the image recognition and motion prediction algorithms, and the first event, whether a second dynamic criterion is met for a second tracked swimmer; and
in accordance with a determination that the second dynamic criterion is met for the second tracked swimmer, generating a second detection signal indicating a second event associated with the second tracked swimmer, wherein the second event comprises the second tracked swimmer drowning.

2. The system of claim 1, wherein the instructions further comprise:
determining a number of swimmers based on the interior pool and foreground pixels and the swimming pool information;
detecting a swimmer leaving or entering the interior pool region;
updating the number of swimmers based on the swimmer detection;
determining that the swimmer entered the interior pool region after a predetermined amount of time;
in accordance with the determination that the swimmer entered the interior pool region after the predetermined amount of time, tagging the swimmer with an identifier; and
in response to detecting the swimmer leaving the interior pool region, untagging the swimmer.

3. The system of claim 1, wherein:
the instructions further comprise determining a number of swimmers based on the interior pool and foreground pixels and the swimming pool information, and
the first dynamic criterion is met when a number of detected foreground objects is less than the number of swimmers.

4. The system of claim 1, wherein:
the instructions further comprise determining a number of swimmers based on the interior pool and foreground pixels and the swimming pool information, and
the number of swimmers is a number of detected foreground objects.

5. The system of claim 1, wherein the first dynamic criterion includes at least one of swimmer speed, swimmer posture, a splash threshold, an activity threshold, a submergence threshold, a submergence variance, and swimmer vertical movement.

6. The system of claim 1, wherein:
determining whether the first dynamic criterion is met further comprises determining a probability of the first event based on a criterion emphasis factor associated with the first tracked swimmer, and
the instructions further comprise:
learning behaviors of the tracked swimmers; and
updating the criterion emphasis factors of the tracked swimmers based on the learned behaviors.

7. The system of claim 1, wherein the instructions further comprise generating an alert associated with the event in response to the generated first detection signal.

8. The system of claim 1, wherein the computing system and the camera are configured to communicate wirelessly.

9. The system of claim 1, wherein the computing system is one of AI processor, cloud computing platform, a processor with AI and video/graphics booster technology having sufficient computation power and processing speed, a fast computing platform, and a parallel computing platform.

10. The system of claim 1, wherein the instructions further comprise updating the first dynamic criterion based on at least one of a Monte-Carlo simulation, user data, neural network data, and random forest data.

11. The system of claim 1, wherein:
determining whether the first dynamic criterion is met further comprises determining a probability of the event based on a criterion emphasis factor associated with the first tracked swimmer, and
the instructions further comprise:
determining whether the first tracked swimmer is moving relative to a center of the first tracked swimmer;
in accordance with a determination that the first tracked swimmer is moving relative to the center of the first tracked swimmer, updating the criterion emphasis factors of the first tracked swimmers; and
in accordance with a determination that the first tracked swimmer is not moving relative to the center of the first tracked swimmer, forgoing updating the criterion emphasis factors of the first tracked swimmers.

12. The system of claim 1, wherein the instructions further comprise:
determining whether a swimmer is in the swimming pool;
in accordance with a determination that the swimmer is in the swimming pool, transmitting an instruction to receive captured frames from the video camera and to transmit the captured frames to the computing system; and
in accordance with a determination that the swimmer is not in the swimming pool, forgoing transmitting the instruction.

13. The system of claim 1, further comprising:
an alarm configured to generate an alert associated with the first event associated with the first tracked swimmer; and
a router configured to wirelessly communicate with the computing system and the alarm over a first network connection, wherein the router is configured to wirelessly communicate with the computing system and the alarm over the first network connection in accordance with a determination that the computing system is not connected to a second network.

14. The system of claim 1, wherein:
the block for the first tracked swimmer and the block for the second tracked swimmer at least partially overlap, the instructions further comprise separating, using a Markov Random Field, the at least partial overlap, and the first swimmer and the second swimmer are tracked further using the separated overlap.

15. The system of claim 1, wherein:

one or more of the first detection signal and the second detection signal are generated further in accordance with a determination that a combined criterion is met for the respective tracked swimmer, and the combined criterion is generated using a generalized reduced multivariable polynomial network.

16. The system of claim 1, wherein the instructions further comprise:

determining a difference between first background pixels identified at a first time and second background pixels identified at a second time, wherein the difference between the first background pixels and the second background pixels indicates a difference between a swimming pool setup at the first time and a swimming pool setup at the second time; and in accordance with the determining the difference between first background pixels and second background pixels, updating one or more of the first dynamic criterion and the second dynamic criterion.

17. A method, comprising:

capturing, with a video camera, frames of a swimming pool;

receiving the frames captured with the video camera;

for each frame captured with the video camera, identifying:

interior pool pixels associated with an interior region of the swimming pool in the frame, the interior pool region including a water area of the swimming pool, background pixels in the frame, foreground pixels in the frame, wherein the foreground pixels correspond to detected foreground objects, and swimming pool information associated with objects in the frame;

based on the identified background pixels, foreground pixels, and swimming pool information:

forming a block for each swimmer in the foreground pixels, and tagging each swimmer in the frame with a respective identifier;

tracking each swimmer by using image recognition and motion prediction algorithms on the formed blocks;

determining, based on the swimming pool information and the image recognition and motion prediction algorithms, whether a first dynamic criterion is met for a first tracked swimmer;

in accordance with a determination that the first dynamic criterion is met for the first tracked swimmer, generating a first detection signal indicating a first event associated with the first tracked swimmer, wherein the first event comprises the first tracked swimmer drowning;

determining, based on the swimming pool information, the image recognition and motion prediction algorithms, and the first event, whether a second dynamic criterion is met for a second tracked swimmer; and in accordance with a determination that the second dynamic criterion is met for the second tracked swimmer, generating a second detection signal indicating a second event associated with the second tracked swimmer, wherein the second event comprises the second tracked swimmer drowning.

18. The method of claim 17, further comprising:

determining a number of swimmers based on the interior pool and foreground pixels and the swimming pool information;

detecting a swimmer leaving or entering the interior pool region;

updating the number of swimmers based on the swimmer detection;

determining that the swimmer entered the interior pool region after a predetermined amount of time;

in accordance with the determination that the swimmer entered the interior pool region after the predetermined amount of time, tagging the swimmer with an identifier; and in response to detecting the swimmer leaving the interior pool region, untagging the swimmer.

19. The method of claim 17, further comprising determining a number of swimmers based on the interior pool and foreground pixels and the swimming pool information, wherein the first dynamic criterion is met when a number of detected foreground objects is less than the number of swimmers.

20. The method of claim 17, further comprising:

determining whether a swimmer is in the swimming pool;

in accordance with a determination that the swimmer is in the swimming pool, transmitting an instruction to receive captured frames from the video camera and to transmit the captured frames to the computing system; and in accordance with a determination that the swimmer is not in the swimming pool, forgoing transmitting the instruction.

21. A non-transitory computer readable storage medium storing one or more programs, the one or more programs comprising instructions, which when executed by an electronic device with one or more processors and memory, cause the device to perform a method comprising:

capturing, with a video camera, frames of a swimming pool;

receiving the frames captured with the video camera;

for each frame captured with the video camera, identifying:

interior pool pixels associated with an interior region of the swimming pool in the frame, the interior pool region including a water area of the swimming pool, background pixels in the frame, foreground pixels in the frame, wherein the foreground pixels correspond to detected foreground objects, and swimming pool information associated with objects in the frame;

based on the identified background pixels, foreground pixels, and swimming pool information:

forming a block for each swimmer in the foreground pixels, and tagging each swimmer in the frame with a respective identifier;

tracking each swimmer by using image recognition and motion prediction algorithms on the formed blocks;

determining, based on the swimming pool information and the image recognition and motion prediction algorithms, whether a first dynamic criterion is met for a first tracked swimmer;

in accordance with a determination that the first dynamic criterion is met for the first tracked swimmer, generating a first detection signal indicating a first event associated with the first tracked swimmer, wherein the first event comprises the first tracked swimmer drowning;

determining, based on the swimming pool information, the image recognition and motion prediction algorithms, and the first event, whether a second dynamic criterion is met for a second tracked swimmer; and in accordance with a determination that the second dynamic criterion is met for the second tracked swimmer, generating a second detection signal indicating a second event associated with the second tracked swimmer, wherein the second event comprises the second tracked swimmer drowning.

22. The non-transitory computer readable storage medium of claim 21, wherein the method further comprises:

determining a number of swimmers based on the interior pool and foreground pixels and the swimming pool information;

detecting a swimmer leaving or entering the interior pool region;

updating the number of swimmers based on the swimmer detection;

determining that the swimmer entered the interior pool region after a predetermined amount of time;

in accordance with the determination that the swimmer entered the interior pool region after the predetermined amount of time, tagging the swimmer with an identifier; and in response to detecting the swimmer leaving the interior pool region, untagging the swimmer.

23. The non-transitory computer readable storage medium of claim 21, wherein the method further comprises:

determining whether a swimmer is in the swimming pool;

in accordance with a determination that the swimmer is in the swimming pool, transmitting an instruction to receive captured frames from the video camera and to transmit the captured frames to the computing system; and in accordance with a determination that the swimmer is not in the swimming pool, forgoing transmitting the instruction.

* * * * *